US012809398B2

(12) United States Patent
Chiocco et al.

(10) Patent No.: US 12,809,398 B2
(45) **Date of Patent: *Nov. 24, 2026**

(54) SYSTEMS AND METHODS FOR OBTAINING LOCATION DATA

(71) Applicant: Chioccoli, LLC, Austin, TX (US)

(72) Inventors: Gregory Daniel Chiocco, Sunnyvale, CA (US); Michael Brogioli, Austin, TX (US)

(73) Assignee: Chioccoli LLC, Austin, TX (US)

( * ) Notice: Subject to any disclaimer, the term of this patent is extended or adjusted under 35 U.S.C. 154(b) by 145 days.

This patent is subject to a terminal disclaimer.

(21) Appl. No.: 18/807,970

(22) Filed: Aug. 17, 2024

(65) Prior Publication Data

US 2024/0411328 A1 Dec. 12, 2024

Related U.S. Application Data

(63) Continuation of application No. 18/080,411, filed on Dec. 13, 2022, now Pat. No. 12,066,838, which is a (Continued)

(51) Int. Cl.
*G05D 1/695* (2024.01)
*B64C 39/02* (2023.01)
(Continued)

(52) U.S. Cl.
CPC ........... *G05D 1/695* (2024.01); *B64C 39/024* (2013.01); *B64U 10/13* (2023.01); (Continued)

(58) Field of Classification Search
CPC .............................. G05D 1/695; B64C 39/024
See application file for complete search history.

(56) References Cited

U.S. PATENT DOCUMENTS 10,480,131 B1 11/2019 McAlpine et al.
10,905,057 B2 2/2021 Paralikar et al.
(Continued)

FOREIGN PATENT DOCUMENTS

JP 2017068666 A 4/2017

OTHER PUBLICATIONS

PTO Non-Final Office Action dated May 16, 2024, U.S. Appl. No. 18/242,483, pp. 1-48.
(Continued)

*Primary Examiner* — Luke Huynh
(74) *Attorney, Agent, or Firm* — Outlier Patent Attorneys, PLLC; Ian Holloway

(57) ABSTRACT

Obtaining location data in a novel way is considered to be a part of this invention. An exemplary method for doing so includes identifying first positioning information for a data delivery vehicle based at least in part on a plurality of positioning signals received at the data delivery vehicle from a set of satellites of a global navigation satellite system (GNSS). The example method comprises obtaining relative position information associated with a position vector from the data delivery vehicle to a remote vehicle, the remote vehicle being unable to receive the plurality of positioning signals from the set of satellites. The example method comprises determining second positioning information for the remote vehicle based at least in part on the first positioning information and the relative position information. The example method comprises transmitting the second positioning information to the remote vehicle.

18 Claims, 19 Drawing Sheets

Related U.S. Application Data continuation of application No. 17/578,408, filed on Jan. 18, 2022, now Pat. No. 11,526,180, which is a continuation-in-part of application No. 17/306,839, filed on May 3, 2021, now Pat. No. 11,354,757, which is a continuation-in-part of application No. 17/060,025, filed on Sep. 30, 2020, now Pat. No. 11,750,701.

(60) Provisional application No. 62/907,727, filed on Sep. 30, 2019.

(51) Int. Cl.

| | |
|---|---|
| *B64U 10/13* | (2023.01) |
| *B64U 101/00* | (2023.01) |
| *B64U 101/20* | (2023.01) |
| *B64U 101/30* | (2023.01) |
| *B64U 101/40* | (2023.01) |

(52) U.S. Cl.
CPC ...... *B64U 2101/00* (2023.01); *B64U 2101/20* (2023.01); *B64U 2101/30* (2023.01); *B64U 2101/40* (2023.01); *B64U 2201/10* (2023.01)

(56) References Cited

U.S. PATENT DOCUMENTS

| | | | | |
|---|---|---|---|---|
| 11,067,990 | B2 * | 7/2021 | Wu | G05D 1/0094 |
| 11,235,890 | B1 | 2/2022 | Dahlstrom et al. | |
| 11,354,757 | B2 | 6/2022 | Chiocco et al. | |
| 11,408,138 | B2 | 8/2022 | Roy et al. | |
| 11,750,701 | B2 | 9/2023 | Chiocco et al. | |
| 12,066,838 | B2 * | 8/2024 | Chiocco | B64U 80/86 |
| 2014/0336848 | A1 | 11/2014 | Saund et al. | |
| 2015/0015697 | A1 | 1/2015 | Redden et al. | |
| 2015/0105984 | A1 | 4/2015 | Birrell et al. | |
| 2016/0018822 | A1 | 1/2016 | Nevdahs et al. | |
| 2016/0196753 | A1 * | 7/2016 | Jarrell | G08G 5/57 701/16 |
| 2017/0015416 | A1 * | 1/2017 | O'Connor | A01B 79/005 |
| 2018/0246762 | A1 | 8/2018 | Tarsa et al. | |
| 2019/0042227 | A1 | 2/2019 | Sharma | |
| 2019/0043370 | A1 * | 2/2019 | Mulhall | G08G 5/26 |
| 2019/0047010 | A1 | 2/2019 | Barker et al. | |
| 2019/0102164 | A1 | 4/2019 | Gur et al. | |
| 2019/0146426 | A1 | 5/2019 | Blank | |
| 2019/0261560 | A1 | 8/2019 | Jelenkovic | |
| 2020/0128734 | A1 | 4/2020 | Brammeier et al. | |
| 2020/0167722 | A1 | 5/2020 | Goldberg | |
| 2020/0323134 | A1 | 10/2020 | Darr et al. | |
| 2020/0326674 | A1 | 10/2020 | Palla et al. | |
| 2020/0351380 | A1 | 11/2020 | Fedorov et al. | |
| 2021/0158041 | A1 | 5/2021 | Chowdhary et al. | |
| 2022/0171411 | A1 | 6/2022 | Chiocco et al. | |
| 2022/0253635 | A1 | 8/2022 | Yu et al. | |
| 2023/0300195 | A1 | 9/2023 | Sharma et al. | |

OTHER PUBLICATIONS

USPTO Non-Final Office Action dated Jul. 8, 2021, U.S. Appl. No. 17/306,839.
USPTO Non-Final Office Action dated Oct. 7, 2022, U.S. Appl. No. 17/060,025.
USPTO Notice of Allowance dated Feb. 2, 2022, U.S. Appl. No. 17/306,839.

* cited by examiner

300

SYSTEMS AND METHODS FOR OBTAINING LOCATION DATA

CROSS-REFERENCE TO RELATED APPLICATIONS

This application is a continuation of U.S. Non-Provisional patent application Ser. No. 18/080,411, filed on Dec. 13, 2022, titled "SYSTEMS AND METHODS FOR OBTAINING LOCATION DATA.", which is a continuation of U.S. Non-Provisional patent application Ser. No. 17/578,408, filed on Jan. 18, 2022, titled "SYSTEMS AND METHODS FOR TRAVERSING A THREE DIMENSIONAL SPACE." That application is a continuation-in-part of U.S. Non-Provisional patent application Ser. No. 17/306,839 titled "SYSTEMS AND METHODS FOR AGGREGATING HARVEST YIELD DATA," filed on May 3, 2021, which is a continuation-in-part of U.S. Non-Provisional patent application Ser. No. 17/060,025, titled "SYSTEMS AND METHODS FOR CONNECTED COMPUTATION IN NETWORK CONSTRAINED SYSTEMS," filed on Sep. 30, 2020. The parent application claims benefit of, and claims priority to U.S. Provisional Patent Application Ser. No. 62/907,727, titled "SYSTEMS AND METHODS FOR CONNECTED COMPUTATION IN NETWORK CONSTRAINED SYSTEMS," filed on Sep. 30, 2019. All applications are hereby incorporated by reference in their entirety.

BACKGROUND

Field of the Art

This disclosure relates to systems and methods for improving agronomics production and yield. More specifically, the present invention relates to systems and methods for aggregated harvesting yield based on autonomous vehicle deployment.

Discussion of the State of the Art

According to the UN's Department of Economic and Social Affairs, the world's population is over 7.6 billion people. It is projected to be north of 9.8 billion people in 2050 while annual global crop production growth has been hovering at only 1.4% per year. It won't take long before demand for food out-strips our capacity to grow it.

In an effort to boost productive crop yield—especially in face of increasingly unpredictable weather patterns—farmers are turning to technology solutions, which are sometimes generally referred to as Precision Agriculture or Digital Agriculture. The leaders in this space have begun to utilize the data stream produced by sophisticated farm machinery. This data is used to identify areas of improvement and risk mitigation.

Today's data analytics systems are quite advanced and sophisticated. However, it is still rather difficult to connect data produced by farm machinery and in-field sensors to cloud analytics systems because most farms and farm machinery is located in rural areas with poor network connectivity. The network connectivity and availability problem is especially acute in less developed countries because of lack of investment by the telecoms in these sparsely populated regions. For these reasons connected computation, which is traditionally available to other applications, is not a viable option for agribusinesses that want to leverage sophisticated computing systems to unlock data driven insights.

Timely data transfer is a key enabler for the end-to-end processing of agricultural data—especially when timely data processing is necessary to implement the insights that are provided by analytics systems. However, farmers struggle to connect their machines to a network infrastructure because of the limitations outlined above. Because of the poor network availability, communities with poor network connectivity typically rely on USB sticks that plug into a vehicle's onboard monitor to store data. At the end of the day or week, the USB sticks are collected and brought back to the office to ingest the valuable data generated by the machines and its sensors.

This current solution, however, is unreliable at best, and at worst, leads to complete failure and data loss. For example, there is no end of stories about lost, erased, stolen and confused USB sticks, which not only reduces the amount of available data, but also potentially exposes the downstream analytics system to false or inapplicable data. Take for example a tractor in Brazil planting a field of soybeans in Mato Grosso State. The largest planters pulled by these high horsepower tractors have the ability to plant over 48 rows at a time. It is easy to imagine the complexity when dealing with 10, 50 or 100 USB sticks across multiple tractors, combines, sprayers and spreaders that have worked across hundreds of fields in a single area. One misplaced or confused USB drive could result in thousands of acres of lost data.

This problem is exacerbated because of the closed-end nature of modern agricultural systems. For example, modern planters are not only planting the seeds themselves at precisely controlled populations, they are applying fertilizers and crop protection products at the same time. All of this is being tightly controlled and monitored by on-board systems that are logging the location of each seed with RTK level GPS positioning. Months later this field is harvested with a combine equipped with yield monitor that can almost instantaneously calculate the productivity of the field. The killer app for these systems is the ability to close the loop with the 'as-planted' map from the planter. By doing this farmers can evaluate the efficacy of seed selection and crop protection package. Couple this with soil sample data and historical weather and the relevant decision makers can make very informed decisions about farming practices for the coming crop year. As such, lost data, which may be caused by lost or misplaced USB sticks or dropped or non-existent network connectivity, can negatively impact an entire growing season (and not just real-time decisions that may have to be made on-site).

The lost or dropped data problem is further exacerbated when it comes to making real-time decisions on a farm based on insights provided by data analytics system. For example, in one crop per year environments, which includes much of the US Midwest, farmers typically must make the most out of every crop year since they only get one chance each year to succeed with any given crop (as opposed to, for example, other areas where farmers are typically planting multiple crops a year providing multiple pathways to profit). Over their lifetimes, such farmers are the primary decision maker on about 40 crops, and, as a result, do not have yield and production data readily available, and, more importantly, cannot afford to guess because a bad decision can prove to be economically disastrous. These farmers are increasingly turning to real time data to inform their mid-year crop protection and fertility decisions. In field sensors that measure soil moisture, soil temperature, ambient temperatures, relative humidity and wind speeds among many other parameters can give farmers the information they need to increase the probability of having a successful crop.

However, reliably connecting these sensors to downstream analytics systems with reliable connection with sufficient bandwidth has proven to be a very complex task. The traditional approach of using legacy cell based technology, or dedicated networks or satellite connectivity has proven to be too expensive and the bandwidth too limited to be a viable option. In addition, as the number of sensors and devices increase in the future, due to cost, technology demand and other factors, strain on various networking technologies will only increase. For these reasons, farmers are simply unable to leverage the advances in Precision Agriculture and to improve yield and/or production.

In addition, farmers are becoming increasingly reliant on computing recommendation systems to obtain the best yield possible from their land tracts. For example, farmers are often using computing systems to obtain recommendations regarding which seeds to plant, which farm management practices to apply, which crop protection plans to apply, which tillage program to apply, etc. Farming analytics software (which can make data driven recommendations about how to obtain optimal output from a field) needs accurate and high-quality current and historic yield information to help analyze farming practices and make recommendations. However, yield data that farmers are able to obtain is historically noisy and inaccurate, and can be unreliable for this purpose. Often, this is because different harvesters (which may be deployed, for example to cooperatively harvest a land tract or a given area) use different yield monitors, which are not usually calibrated to each other. As a result, when yield data is plotted on a land tract, it can appear "zebra-striped" and/or generally noisy. This type of data results typically can cause the farming analytics software to output unreliable recommendations. In addition, yield data can be further affected by variables related to climate, weather, topographical and geographical conditions and contexts. Currently, farm analytics software is hampered by poor and/or unreliable yield data, and, because of the unreliable yield data, is unable to provide useful or valuable recommendations.

Deployment of harvesters may be automated. To keep track of portions of a tract harvested, the automated harvesters may need to keep track of location information associated with harvested areas. Additionally, to keep track of portions of a tract needing harvesting, the automated harvesters may need to receive location information associated with areas the automated harvesters need to navigate to. However, some portions of the tract may contain obstructions that prevent the automated harvesters from receiving location information through a normal method. What is needed is a way to get the automated harvesters location information when they are in a portion of the tract that contains obstructions that prevent the automated harvesters from receiving location information through the normal method.

An automated vehicle may traverse a planned path. An unanticipated obstacle in the planned path may necessitate that the automated vehicle alter the planned path. However, if the revelation of the obstacle happens too late, it may be cumbersome to have the automated vehicle turn around and backtrack. Furthermore, it may be in the interest of time and money efficiency to alter the planned path as soon as possible. What is needed is a way to observe unanticipated obstacles in planned paths before automated vehicles encounter the obstacles.

SUMMARY

The illustrative embodiments provide a method, system, and computer program product for enabling data-centric computing platform comprising device, edge, and cloud computing infrastructure for reliable data transfer and data processing in an end-to-end digital agriculture system. Specifically, the present invention enables device and edge computing on certain collected data, which enables deep analytics in a cloud computing device. More specifically, the present invention standardizes how IoT data from field devices is ingested and normalized, provides a systematic approach to divide and distribute data-processing workload, automatically scales data-processing tasks to accommodate a wide spectrum of data complexity and volume, and simplifies how AI/ML inferencing functions are built and deployed to edge devices.

As such the present invention is a departure from currently available edge computing solutions that address one or two of these challenges described above. For instance, AWS GREENGRASS® service permits users to run micro-services (in the form of Lambda functions) on embedded edge gateways. AZURE® IoT EDGE offers similar functionality except in the form of explicitly containerized apps. But these services fail to enable sophisticated data-processing capability over a network of large number of IoT and edge devices before sending the aggregated data to the cloud. Unlike these systems which simply cannot deal with the multi-dimensional complexity that is present in working with field data, the present invention takes into account sensor information on the in-field machinery itself, as well as inter-communication between machinery in field without human intervention—while, at the same time, collecting and storing robust data sets in agricultural areas of little or perhaps no network connectivity. In one embodiment of the invention, aerial based drones or similar technology may be used as a means to monitor in-field assets, as well as collect, process, and move data sets physically while in memory or in persistent storage from one location to another, the latter of which may possess network connectivity at limited or intermittent availability.

The present invention enables real-time decision making in-field environments, especially ones that are bereft of network connectivity. For example, the data transport systems and methods disclosed herein enables coordination of a grain cart with a grain elevator that may otherwise not be connected to each other. More specifically, the present invention enables a grain cart to ramp up, ramp down, or otherwise continue operation based on space and availability constraints at a grain elevator. In another example, the drone may obtain pricing information from two or more grain elevators and provide to an in-field environment with little to no network connectivity. Armed with this data, the in-field operator may be enabled to make a decision about whether to drive extra miles for higher prices by computing, for example, the additional fuel cost associated with a further drive and whether it would yield a higher return in terms of higher prices being offered.

In addition, the present invention enables two-way communication between a data delivery vehicle and an edge compute node and/or cloud compute node. As such, when a data delivery vehicle travels to the edge of a cell, it can not only upload the data that it has received form a physical asset, but it can download other relevant information for in-field operations. For example, continuing the example above, it can download the latest grain elevator prices and/or offerings for various grain elevators in an area (which may not have connectivity either), and upload that data to an edge compute node that can make a variety of computations about which grain elevator a transport vehicle should travel to for maximizing returns, etc. The same systems and methods enable intelligent in-field and real-time decision making in other use cases or contexts as well. For example, the two-way data processing and data transport systems and methods described herein enable real-time in field decision making for, hauling scrap out of a construction site, for picking up asphalt for a construction site, etc.

Although various embodiments of the invention described herein are related to smart agriculture systems, the present invention may be used in any use case or scenario where IoT devices are deployed, including, but not limited to commercial and home automation, smart factories or smart manufacturing, smart cities, smart environment, smart agriculture, smart health systems, smart construction and heavy machinery environments. For example, IoT networks may be used for smart agriculture systems, water distribution systems, electric power distribution systems, pipeline control systems, plant control systems, light switches, thermostats, locks, cameras, alarms, motion sensors, construction devices, and the like including any industrial environment.

Embodiments herein recognize that determining accurate agricultural or harvesting yields can be challenging in view of a myriad of factors, including variability in performance and efficiencies among harvester machines and machine types, lack of, or limited, historical yield data correlated with crop varieties, prevailing growth as well as harvesting climate, weather and topographical conditions, and limitations in communication infrastructure and technology which can adversely and directly affect accurate determination of harvesting yields, especially in real-time during actual harvesting operations.

In particular, provided is a method for normalizing harvest yield data from an operation for harvesting crops. The computer-implemented method comprises receiving combine harvest data from a harvesting vehicle, the combine harvest data obtained from a yield monitor sensor that is on-board the harvesting vehicle, the combine harvest data comprising data collected from a first portion of a land tract; receiving high-resolution harvest data from an data delivery vehicle, the high-resolution harvest data obtained from a sensor suite that is on-board the data delivery vehicle, the high-resolution harvest data comprising data collected from at least the first portion of the land tract; obtaining edge compute data, the edge compute data comprising additional information related to at least one of the land tract, the crop, historic weather information associated with an agricultural cycle, and farm practices data; segmenting the received combine harvest data, the received high-resolution harvest data, and the obtained edge compute data; applying a normalization model to the segmented data for normalizing harvest yield data, the normalization model applied to the received combine harvest data, the received high-resolution harvest data, and the obtained edge compute data; and computing a normalized harvest yield for at least a portion of the land tract based on the applied data normalization model.

Also provided is a data delivery vehicle including a processor and a non-transitory computer readable memory. The memory stores instructions, which, when executed in the processor cause operations comprising receiving combine harvest data from a harvesting vehicle, the combine harvest data obtained from a yield monitor sensor that is on-board the harvesting vehicle, the combine harvest data comprising data collected from a first portion of a land tract; receiving high-resolution harvest data from an aerial data delivery vehicle, the high-resolution harvest data obtained from a sensor suite that is on-board the aerial vehicle, the high-resolution harvest data comprising data collected from at least the first portion of the land tract; obtaining edge compute data, the edge compute data comprising additional information related to at least one of the land tract, the crop, historic weather information associated with an agricultural cycle, and farm practices data; segmenting the received combine harvest data, the received high-resolution harvest data, and the obtained edge compute data; applying a normalization model to the segmented data for normalizing harvest yield data, the normalization model applied to the received combine harvest data, the received high-resolution harvest data, and the obtained edge compute data; and computing a normalized harvest yield for at least a portion of the land tract based on the applied data normalization model.

Further provided is a non-transitory computer readable memory storing instructions. The instructions are executable in a processor device to cause operations comprising receiving combine harvest data from a harvesting vehicle, the combine harvest data obtained from a yield monitor sensor that is on-board the harvesting vehicle, the combine harvest data comprising data collected from a first portion of a land tract; receiving high-resolution harvest data from an aerial data delivery vehicle, the high-resolution harvest data obtained from a sensor suite that is on-board the aerial vehicle, the high-resolution harvest data comprising data collected from at least the first portion of the land tract; obtaining edge compute data, the edge compute data comprising additional information related to at least one of the land tract, the crop, historic weather information associated with an agricultural cycle, and farm practices data; segmenting the received combine harvest data, the received high-resolution harvest data, and the obtained edge compute data; applying a normalization model to the segmented data for normalizing harvest yield data, the normalization model applied to the received combine harvest data, the received high-resolution harvest data, and the obtained edge compute data; and computing a normalized harvest yield for at least a portion of the land tract based on the applied data normalization model.

Further provided is a method comprising: determining first positioning information for a data delivery vehicle based at least in part on a plurality of positioning signals received at the data delivery vehicle from a set of satellites of a global navigation satellite system (GNSS); obtaining relative position information associated with a position vector from the data delivery vehicle to a remote vehicle, the remote vehicle being unable to receive the plurality of positioning signals from the set of satellites; determining second positioning information for the remote vehicle based at least in part on the first positioning information and the relative position information; and transmitting the second positioning information to the remote vehicle.

In an aspect, the position vector from the data delivery vehicle to the remote vehicle is defined in accordance with one of a global and a local coordinate system.

In an aspect, the position vector is established based at least in part on a distance and a directional measurement in accordance with a sensor device housed in the data delivery vehicle.

In an aspect, the sensor device comprises at least one of a light detection and ranging (LIDAR) sensor device, a radio detection and ranging (RADAR) sensor device, an infrared optical sensor device, and a camera.

In an aspect, the method further comprises: determining the second positioning information for the remote vehicle in accordance with a global coordinate system consistent with the first positioning information as determined from the plurality of positioning signals received from the set of satellites.

In an aspect, the method further comprises: detecting at least one of a loss of reception and a degradation in quality of reception of the plurality of positioning signals from the set of satellites, wherein the data delivery vehicle is disposed in a docked configuration with the remote vehicle; and launching, responsive to the at least one of the loss and the degradation, the data delivery vehicle in termination of the docked configuration with the remote vehicle.

In an aspect, the at least one of the loss and the degradation is precipitated by at least one of occlusion, a gradual loss of power, a catastrophic loss of power, ionospheric scintillation, Doppler shift, multipath, jamming, spurious satellite transmission and antenna effects.

In an aspect, the method further comprises: navigating, by the data delivery vehicle, to a location that re-establishes reception of the plurality of positioning signals in accordance with a minimum threshold quality of reception thereof; and establishing communication, in accordance with a wireless communication protocol, with the remote vehicle.

In an aspect, the method further comprises: transmitting the second positioning information to the remote vehicle in accordance with the wireless communication protocol, said wireless communication protocol being different from a GNSS communication protocol that establishes the first positioning information.

In an aspect, the data delivery vehicle comprises an autonomous aerial drone.

Further provided is an aerial data delivery vehicle comprising: a processor; and a memory, the memory including instructions executable in the processor, the instructions when executed in the processor causing operations comprising: determining first positioning information for a data delivery vehicle based at least in part on a plurality of positioning signals received at the data delivery vehicle from a set of satellites of a global navigation satellite system (GNSS); obtaining relative position information associated with a position vector from the data delivery vehicle to a remote vehicle, the remote vehicle being unable to receive the plurality of positioning signals from the set of satellites; determining second positioning information for the remote vehicle based at least in part on the first positioning information and the relative position information; and transmitting the second positioning information to the remote vehicle.

In an aspect, the position vector from the data delivery vehicle to the remote vehicle is defined in accordance with one of a global and a local coordinate system.

In an aspect, the position vector is established based at least in part on a distance and a directional measurement in accordance with a sensor device housed in the data delivery vehicle.

In an aspect, the sensor device comprises at least one of a light detection and ranging (LIDAR) sensor device, a radio detection and ranging (RADAR) sensor device, an infrared optical sensor device, and a camera.

In an aspect, the operations further comprise: determining the second positioning information for the remote vehicle in accordance with a global coordinate system consistent with the first positioning information as determined from the plurality of positioning signals received from the set of satellites.

In an aspect, the operations further comprise: detecting at least one of a loss of reception and a degradation in quality of reception of the plurality of positioning signals from the set of satellites, wherein the data delivery vehicle is disposed in a docked configuration with the remote vehicle; and launching, responsive to the at least one of the loss and the degradation, the data delivery vehicle in termination of the docked configuration with the remote vehicle.

In an aspect, the at least one of the loss and the degradation is precipitated by at least one of occlusion, a gradual loss of power, a catastrophic loss of power, ionospheric scintillation, Doppler shift, multipath, jamming, spurious satellite transmission and antenna effects.

In an aspect, the operations further comprise: navigating, by the data delivery vehicle, to a location that re-establishes reception of the plurality of positioning signals in accordance with a minimum threshold quality of reception thereof; and establishing communication, in accordance with a wireless communication protocol, with the remote vehicle.

In an aspect, the operations further comprise: transmitting the second positioning information to the remote vehicle in accordance with the wireless communication protocol, said wireless communication protocol different from a GNSS communication protocol that establishes the first positioning information.

Further provided is a computer readable non-transitory memory including instructions executable in a processor, the instructions when executed in the processor causing operations comprising: determining first positioning information for a data delivery vehicle based at least in part on a plurality of positioning signals received at the data delivery vehicle from a set of satellites of a global navigation satellite system (GNSS); obtaining relative position information associated with a position vector from the data delivery vehicle to a remote vehicle, the remote vehicle being unable to receive the plurality of positioning signals from the set of satellites; determining second positioning information for the remote vehicle based at least in part on the first positioning information and the relative position information; and transmitting the second positioning information to the remote vehicle.

The systems and methods described herein relate to an aerial vehicle-in-loop compute and communications system for enabling at least one autonomous device to traverse a three-dimensional space. An example system comprises a first autonomous vehicle comprising a first sensor suite, the first autonomous vehicle traversing the three-dimensional space in accordance with a path planned vector. The path planned vector is dynamically updated based on a first vector associated with a first object that is identified based on data received from the first sensor suite. An example system comprises a first aerial vehicle comprising a second sensor suite and a communications unit, the first aerial vehicle traversing the three-dimensional space based on at least one of data provided by the second sensor suite, data provided by the first sensor suite, and data provided by other aerial vehicles. The communications unit enables communication with the autonomous vehicle and an edge of network compute interface. An example system comprises an edge of network compute system for storing and/or processing data obtained from the first sensor suite and/or the second sensor suite. The path planned vector is dynamically updated based on data received from at least one of the first sensor suite, the second sensor suite, and cloud interface data.

In an aspect, the example system further comprises an optimization unit for applying weighting factors to data received from the first sensor suite and the second sensor suite.

In an aspect, the optimization unit selects priority instructions from at least one of and/or a combination of data from the first sensor suite and the second sensor suite.

In an aspect, the example system further comprises a teleoperation intervention unit. The first sensor data and second sensor data is provided to the teleoperation intervention unit.

In an aspect, the first aerial vehicle traverses to a location within the three-dimensional space based on instructions received from the teleoperation intervention unit.

In an aspect, the path planned vector is computed by a path planning unit on the first autonomous vehicle.

In an aspect, the path planned vector is computed by a path planning unit on the first aerial vehicle.

In an aspect, the path planned vector is computed by a path planning unit on the the edge of network compute system or a cloud computing system in communication with the edge of network compute system.

In an aspect, the first autonomous vehicle is operating in coordination with other autonomous vehicles.

In an aspect, the first sensor suite comprises at least one of a light detection and ranging (LIDAR) sensor device, a radio detection and ranging (RADAR) sensor device, an infrared optical sensor device, and a camera.

In an aspect, the first aerial vehicle traverses the three-dimensional space in association with the first autonomous vehicle.

In an aspect, the first aerial vehicle traverses a first distance relative to the first autonomous vehicle based on at least one of: the first vector associated with the first object that is identified based on data received from the first sensor suite, a second vector associated with the first object and/or a second object identified by the second sensor suite, the path planned vector of the first autonomous vehicle, and a traverse vector associated with other aerial vehicles in an area of interest.

In an aspect, the first object and/or the second object are dynamic and also traversing the three-dimensional space.

In an aspect, the first aerial vehicle operating as a device within a constellation of aerial vehicles.

In an aspect, the first aerial vehicle provides at least one of the following data to the first autonomous vehicle: raw data obtained from the second sensor suite, path planning data, and executive control data.

In an aspect, the second sensor suite comprises at least one of a light detection and ranging (LIDAR) sensor device, a radio detection and ranging (RADAR) sensor device, an infrared optical sensor device, and a camera.

In an aspect, the first aerial vehicle comprises a default setting.

In an aspect, the default setting comprises the first aerial vehicle travelling in an orbit around the first autonomous vehicle.

In an aspect, the default setting comprises the first aerial vehicle docking to the first autonomous vehicle.

In an aspect, the first autonomous vehicle is used to mine for earth metals.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
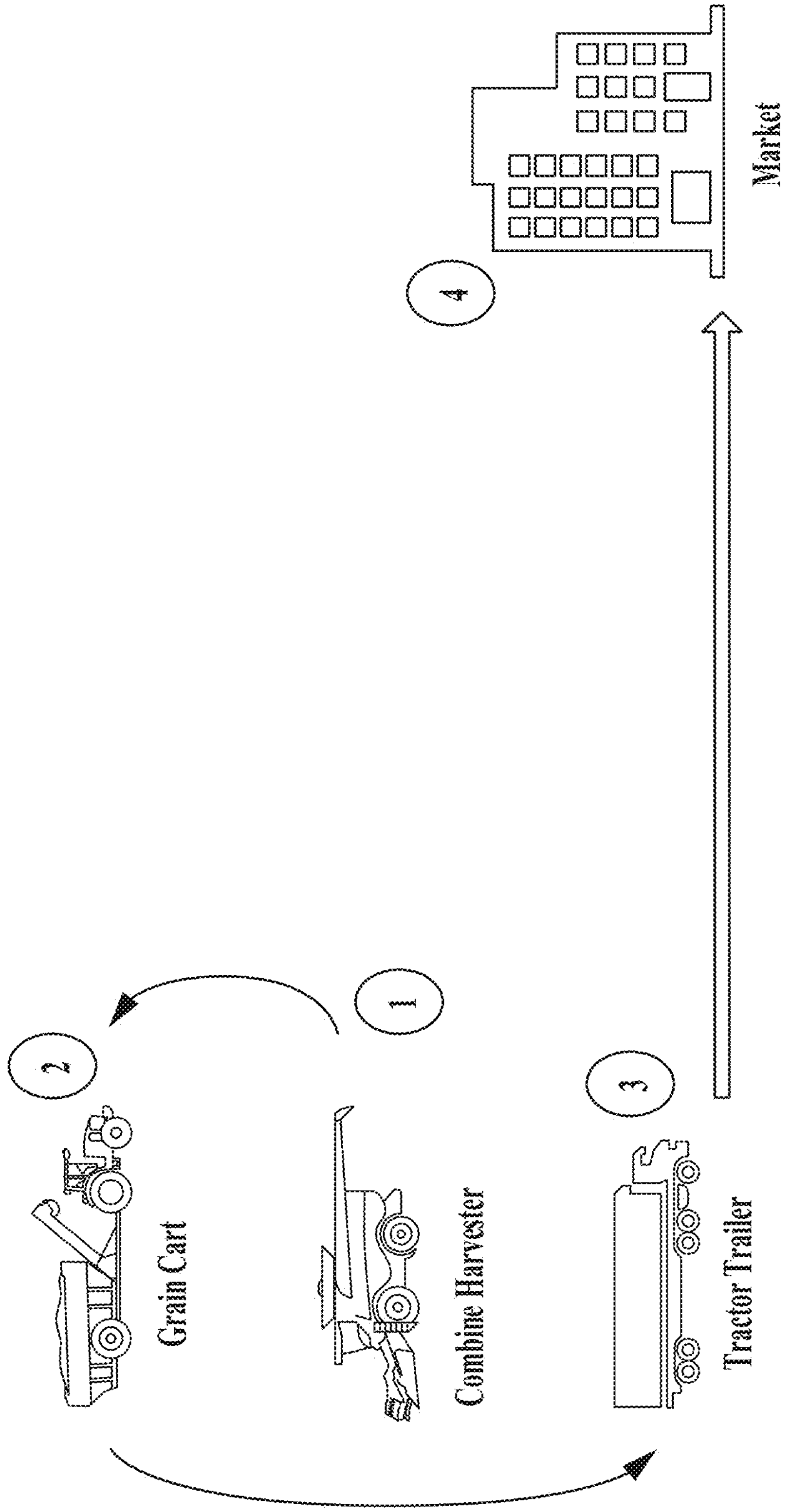
FIG. 1 is a diagram illustrating an example operating environment in accordance with certain aspects of the disclosure.

The inventive system and method (hereinafter sometimes referred to more simply as "system" or "method") described herein enable data-centric edge computing infrastructure for reliable data transfer and data processing in an end-to-end digital agriculture system. Specifically, the present invention enables edge computing on certain collected data, which enables deep analytics in a cloud computing device. More specifically, the present invention standardizes how IoT data from field devices is ingested and normalized, provides a systematic approach to divide and distribute data-processing workload, automatically scales data-processing tasks to accommodate a wide spectrum of data complexity and volume, and simplifies how AI/ML inferencing functions are built and deployed to edge devices.

The inventive system and method (hereinafter sometimes referred to more simply as "system" or "method") described herein enable a ground device (e.g., harvester, remote device, etc.) reliant on satellite location data (e.g., information, etc.), but is in a spot where signals from satellites are obstructed, to nonetheless receive location data. An aerial device (e.g., drone, etc.) may be coupled to the ground device. On detection that the ground device cannot receive satellite signals, the aerial device may be detached from the ground device. The aerial device may navigate to an area where the aerial device can receive signals from the satellite. The aerial device may retrieve (e.g., detect, compute, etc.) location data from the received signals. The aerial device may determine a distance to the ground device. The aerial device may use the location data and determined distance to determine location data for the ground device. The aerial device may provide the determined location data to the ground device. The systems and methods described herein greatly expand the area the ground device may travel, while maintaining location data.

The inventive system and method (hereinafter sometimes referred to more simply as "system" or "method") described herein enable at least one autonomous device to traverse a three-dimensional space. An autonomous vehicle may use onboard sensors to traverse a planned path. An aerial vehicle may travel the path ahead of the autonomous vehicle. The aerial vehicle may use sensors to detect obstacles in the path. On detection of an obstacle, a new path may be charted for the autonomous vehicle. The autonomous vehicle may be caused to navigate the new path. The systems and methods described herein may reduce waste and delay associated with an autonomous vehicle traveling down a path that is not navigable.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

While the presently described invention is not limited to the area of agriculture or agronomics, below is provided an exemplary embodiment within that field of invention. This use case considers an agriculture deployment in an area with little or no local network connectivity (fiber, copper, or cellular network coverage) as illustrated in FIG. 1. More specifically, the physical assets required to harvest the crop in a modern day deployment are shown in FIG. 1. A system of combine harvesters must harvest product within the predefined geographical area. The combine harvesters then deposit the payload of product into the grain cart. When the grain cart is deemed full, either by human operator, or increasingly weight and volume measurements within the vehicle itself, the grain cart must deposit the payload into the tractor trailer. Upon depositing the payload, or typically multiple payloads over time and filling of the tractor trailer, the tractor trailer can be deployed to market and/or a downstream processing facility either via autonomous vehicle, human driver or other means.

The logistical nuances of this scenario are quite challenging. First, the payload product is often perishable and thus has a temporal component to its delivery. At the same time, there are numerous cases in which either a combine harvester (or a plurality thereof) may become stationary due to power issues, geographical issues, or meteorological issues thereby stopping the overall agricultural workflow. In addition, the grain cart itself may become physically stuck on site, or may have sensor calibration issues. This may result in sub-optimal deployment such as premature times, or improper load weight. In other instances, the grain cart may fail to deploy altogether. The trailer itself, may also need to know when to deploy to the market based on crop perishability, payload, fuel costs, fuel on-site etc.

While the limitations described above may seem ripe for emergent internet-of-things based deployment, oftentimes the geographical location of the farm and yield is in areas of low or unreliable network connectivity. Moreover, deploying additional human labor to such a scenario is costly and non-scalable at global demand. The challenge then is how to monitor the in-field deployment, how to collect the ever increasingly valuable field and yield data for down stream processing, and how to get said data out of an environment in which there is little or no network connectivity, computational ability or large scale data storage.

Figure 2:
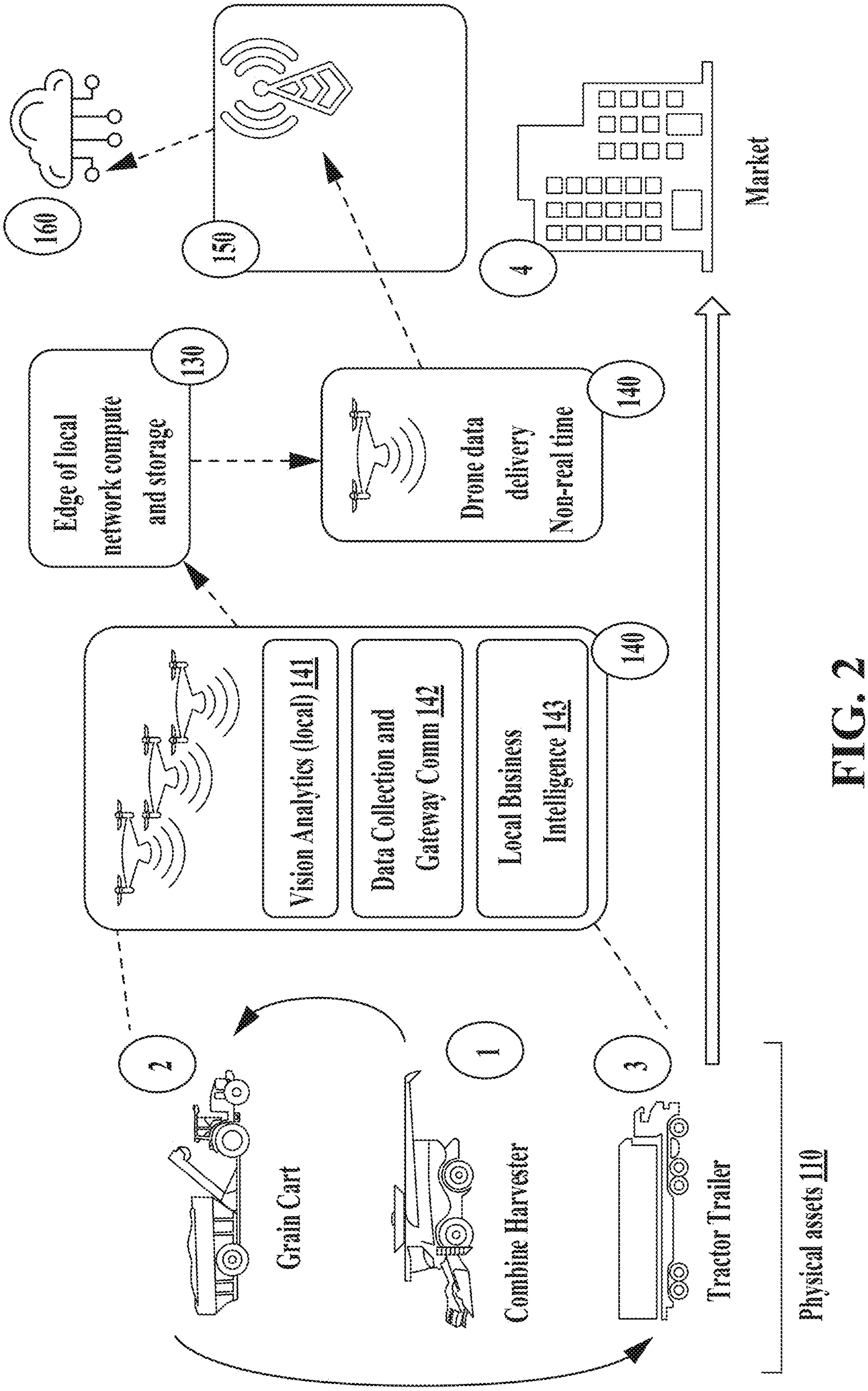
FIG. 2 is a diagram illustrating the inventive system in an exemplary operating environment in accordance with certain aspects of the disclosure.

FIG. 2 illustrates one exemplary embodiment that solves the above mentioned problems within the agricultural space (as also mentioned above, the invention described herein is not limited to this embodiment or use case—it is a non-limiting embodiment described herein for convenience and case of understanding).

As illustrated in FIG. 2, a combine harvester (1) will harvest crops within the deployment zone while recording georeferenced yield data with an onboard monitor. Upon reaching its onboard storage capacity the Combine Harvester will offload into a Grain Cart 2. Grain Cart 2 will accumulate the harvest yield until reaching a certain payload measured in either volume or weight. Upon reaching said limit, Grain Cart 2 transfers payload to Tractor Trailer 3 for shipment to market for sale, a processing facility or long term storage. The market, processing facility or storage facility may be a substantial distance from the location of the crop. The sensors that may be associated with the combine harvester 1, grain cart 2, and tractor trailer 3 are hereinafter also referred to more generally as physical assets 110.

The remaining elements that are illustrated in FIG. 2, illustrate an exemplary system and process for enabling monitoring of the in-field deployment, by, for example, collecting the ever increasingly valuable field and yield data for down stream processing, getting said data out of an environment in which there is little or no network connectivity, computational ability or large scale data storage. More specifically, the data delivery vehicles 140 may download data from the physical assets 110 and store the data on-board. The data delivery vehicle 140 may travel to edge of local network compute and storage device(s) 130 (hereinafter also referred to as local area compute node(s) 130) and upload the stored data on the edge of local network compute and storage device(s) 130. The edge of local network compute and storage device(s) 130 may segment the received data as well as other data that it may received or downloaded from other sources, and may upload data that may be necessary for non-real-time analysis or for cloud compute processes onto the data delivery vehicle 140. The data delivery vehicle 140 may travel to an area 150 defined by available network coverage, including, for example, area of coverage 150 for a given cellular tower, into which the data delivery vehicle 140 is in range with appropriate signal quality. Once in coverage 150, the data may be uploaded to cloud storage and compute infrastructure 160, including, but not limited to for example AMAZON AWS® or MICROSOFT AZURE®. As described in greater detail below, offline and non-real time compute, analysis and business intelligence may reside and execute here.

In one embodiment, the data delivery vehicle 140 may also comprise vision analytics 141, data collection and gateway communications module 142, and local business intelligence module 143. These modules are described in greater detail below, but, generally, these modules enable the data delivery vehicle 140 to communicate with physical assets 110 and make decisions about where to travel to, etc. For example, the data collection and communication gateway 142 (which is also illustrated as data transfer engine 201 in FIG. 5) interfaces with physical assets 110 to receive and/or transmit data to these devices 110. The local vision analytics system 141 determines, in one example, the location of particular physical assets 110 in an effort to compute a flight path to those devices for communication uplink and/or downlink. In other examples, the local vision analytics system 141 identifies areas of the field that are harvested and/or unharvested, planted and/or unplanted, watered and/or un-watered, etc. to identified potential locations associated with physical assets 110 that may be harvesting, planting, watering, fertilizing, etc. The local business intelligence engine 143 may provide data about prices associated with the payload that the physical assets may be monitoring. For example, the business intelligence engine 143 may monitor prices offered by various grain elevators or storage silos, which may signal the physical assets to speed up with processes and/or slow down its processes, work for a longer period of time and/or shorter period of time, etc. This aspect is particularly important in use cases that are handling time-sensitive items and/or perishable items. For example, certain crops must be milled or processes within a certain number of hours after harvesting. In those cases, it is helpful to obtain business intelligence information to speed up or slowdown harvest accordingly. In other embodiments, for example, in construction scenarios, certain items like mixing concrete and delivering it to construction locations, it is helpful to know whether there is a specific need for concrete before initiating an irreversible chemical reaction at a location that is remote from the construction site.

Figure 3:
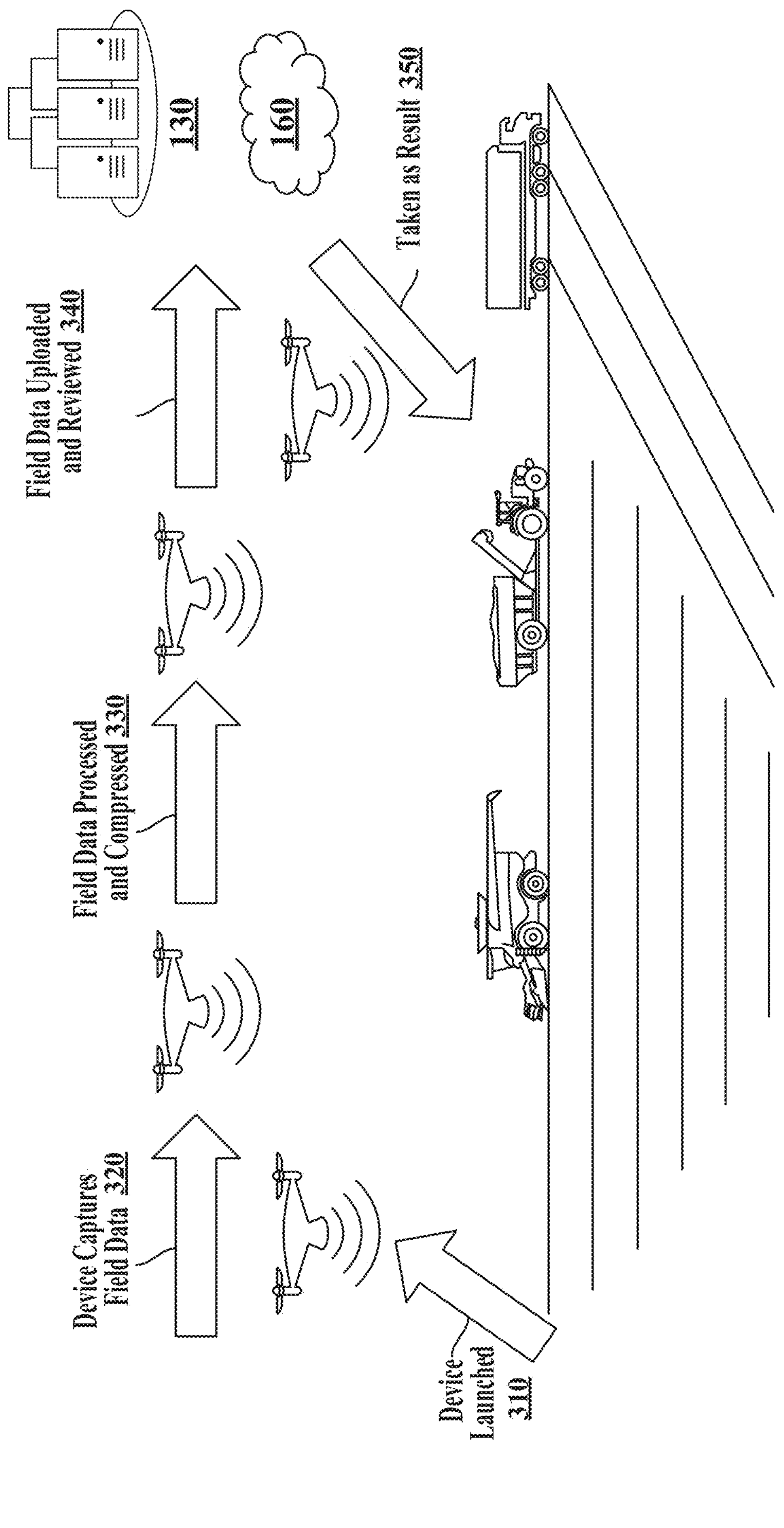
FIG. 3 is a process diagram illustrating the inventive process described herein in accordance with certain aspects of the disclosure.

FIG. 3 illustrates an exemplary process for transporting data to and/or from physical assets 110 to local compute node 130 and/or cloud compute node 160. In one embodiment, the process may begin when a data delivery vehicle 140 (hereinafter sometimes referred to as a drone for case of reference and simplicity) is launched 310. The data delivery vehicle 140 may travel to one or more locations associated with physical assets 110 a capture field data 320. In the agriculture use case, field data may comprise, for example, data from cameras or image devices, multispectral sensor data, sap flow data, temperature data, ambient humidity data, soil temperature data, soil moisture data, air velocity data, rain data, ground data, etc. In a construction use case, for example, field data may comprise material transportation status, build status, reaction start times, end times, etc.

Generally, the data delivery vehicle 140 may be referred to as an unmanned aerial vehicle, a UAV, and/or may refer to any autonomous or semi-autonomous vehicle that is capable of performing some functions without a physically present human pilot. A data delivery vehicle 140 can take various forms. For example, the data delivery vehicle 140 may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities, In some aspects, data delivery vehicle 140 may be capable of vertical take-off and/or landing, among other features.

The process continues at 330 by processing and/or compressing field data that is received from the physical assets 110. A variety of different processing and/or compression systems and techniques may be used, as would be apparent to a person of ordinary skill in the art, without departing from the scope of the invention. In one embodiment, the data delivery vehicle 140 may compute a flight path and autonomously travel to a local area compute node 130 and/or the cloud compute node 160. At 340, once the data delivery vehicle 140 is in range of communication with the local area compute node 130 and/or the cloud compute node 160, it may send the field data to each one or more of the local area compute nodes 130 and/or cloud compute node 160. In one embodiment, the local area compute node 130 may tag and format data to send to the cloud compute node 160. The data delivery vehicle 140 may receive additional data (including, for example, results data) from the local compute node 130 and/or the cloud compute node 160 that may be sent 350 to physical assets 110. The results data may be used to modify the operation of the equipment that may be in operation at the field site. In other words, based on the results data, farmers can make informed changes to their field operations.

Figure 4:
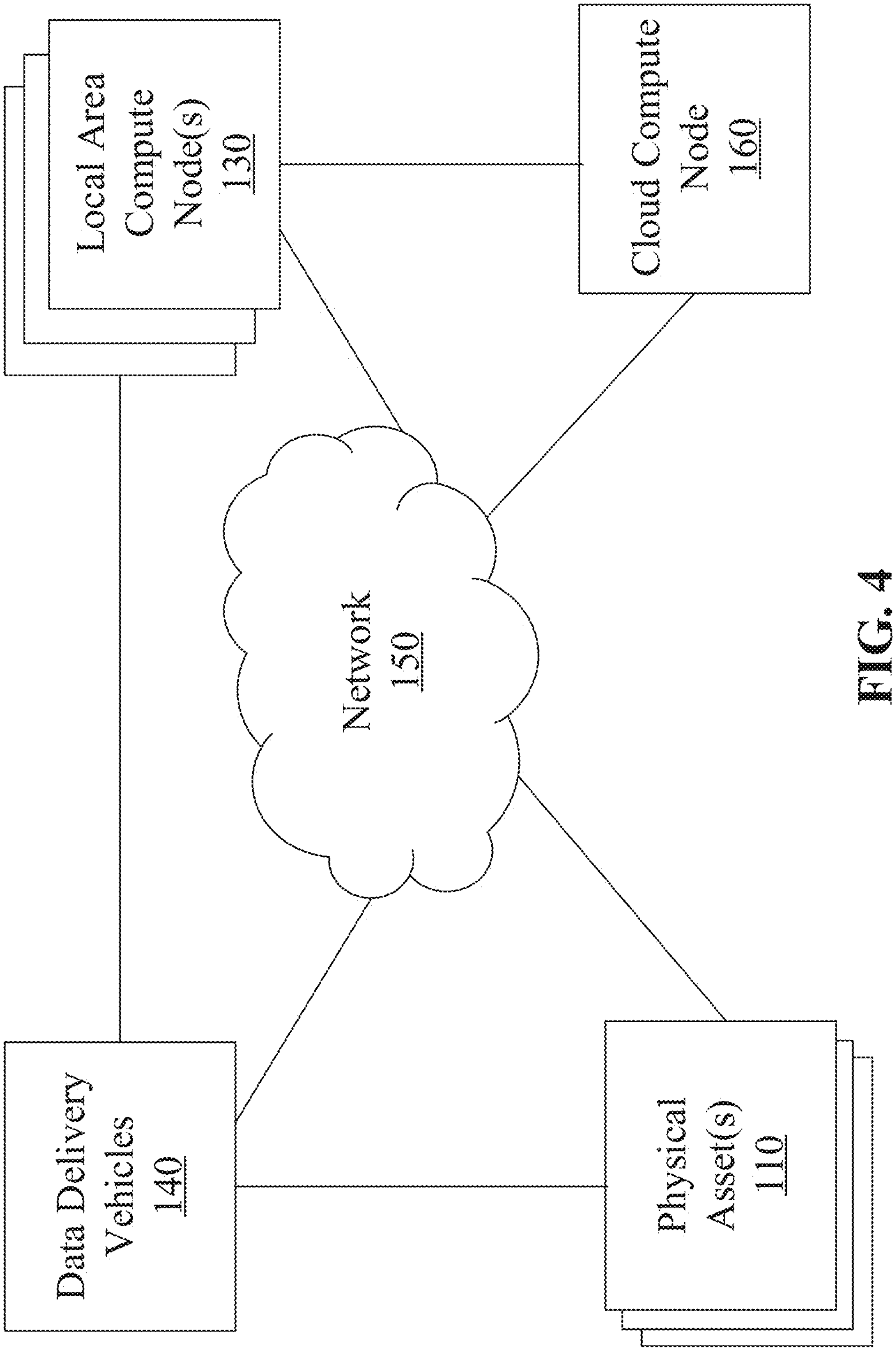
FIG. 4 illustrates an exemplary embodiment of the inventive system described herein.

FIG. 4 illustrates an exemplary embodiment of the inventive system described herein. It comprises physical asset(s) 110, local area compute node(s) 130, cloud compute node 160, data delivery vehicles 140, and network 150. The various computing devices described herein are exemplary and for illustration purposes only. The system may be reorganized or consolidated, as understood by a person of ordinary skill in the art, to perform the same tasks on one or more other servers or computing devices without departing from the scope of the invention.

The physical asset(s) 110 generally refers to sensors that may be placed in a field environment. The sensors may generally sense, measure, compute, control and/or collect data in the field environment. In one embodiment, physical assets 110 may generally also include devices that are commonly known as internet-of-things (IoT) devices, which may connect to other devices to form a local or a wider network of devices that may function in cooperation with each other, autonomously, and/or semi-autonomously. In one embodiment, physical assets 110 may be attached to and/or associated with field devices such as harvesters, grain carts, tractor trailers, etc. in the context of agricultural use case. In a construction use case, physical assets 110 may be attached to and/or associated with filed devices such as cement mixers, bulldozers, diggers, dump trucks, etc.

Often, physical assets(s) 110 are limited in memory, size, or functionality, but also allowing for larger numbers of devices to be deployed for a similar cost to smaller numbers of larger devices. However, physical asset(s) 110 may be a smart phone, laptop, tablet, or PC, or other larger devices, as well as smaller and less expensive low power microcontroller based solutions with limited compute, sensing and network connectivity. Further, physical asset(s) 110 may be virtual devices, such as an application on a smart phone or other computing device. IoT devices (or groups of IoT devices) may be accessible through remote computers, servers, and other systems, for example, to control systems or access data. Physical asset(s) 110 may execute one or more client applications, or a dedicated application to submit sensor data. In particular embodiments, each physical asset 110 may be an electronic device including hardware, software, or embedded logic components or a combination of two or more such components and capable of carrying out the appropriate functions implemented or supported by the device 110.

A group or set of physical asset(s) 110 that are connected to one another using wired and/or wireless technologies may be referred to as a "network of physical assets," an "IoT network," or the like. Networks of physical assets 110 may be used for a wide variety of applications in various deployment scenarios, including precision and/or autonomous agriculture, smart and/or autonomous construction and building environments, commercial and home automation, smart factories or smart manufacturing, smart cities, smart environment, smart agriculture, smart health systems, smart construction, etc. For example, networks of physical assets 110 may be used for smart agriculture systems, water distribution systems, electric power distribution systems, pipeline control systems, plant control systems, light switches, thermostats, locks, cameras, alarms, motion sensors, and the like.

In the case of agriculture based deployments of the invention, physical assets 110 may include, for example, farm-based sensor devices and/or other data sources such as cameras, multispectral sensors, sap flow sensors, temperature sensors, ambient humidity sensors, soil temperature sensors, soil moisture sensors, air velocity transducers, rain sensors, ground data based on flying drones that gather image data, and/or any other type of sensor device that may aid a farmer in determining how the farmer's crops are doing at any given time.

In one embodiment of the invention, the physical assets 110 may transfer the collected data, computed data, monitored data and/or control data wirelessly to data delivery vehicles 140. A variety of different wireless communication systems and methodologies may be used to transfer data from the physical assets 110 to the delivery vehicles 140, as would be apparent to a person of ordinary skill in the art, without departing from the scope of the invention. Various communications systems and methodologies are described in greater detail further below.

The data delivery vehicles 140 may be drones (however, they are not limited to drones) that are in communication with physical assets 110, and can be used to transport data to various other computing devices in the exemplary network environment including local area nodes 130, cloud compute nodes 160, back haul networks, etc. In the absence of reasonable cellular network coverage (or other network) at the crop site, the data delivery vehicles 140 essentially provide the network connectivity of the edge compute node 130 to adjacent cellular network cells at periodic intervals. Upon joining a particular cell, data can be offloaded from data delivery vehicles 140 to the local area compute node 130 and/or the cloud compute node 160 for further processing. In one embodiment, the data delivery vehicles 140 may perform local area object recognition and movement analysis, multi-spectrum imagery collection and light weight processing. Data delivery vehicles 140 may also perform light weight data collection on device, and light weight business intelligence.

Local area compute nodes 130 generally refer to well-provisioned computing devices that are capable of sophisticated analysis. In other words, the computing systems of the local area compute nodes 130 are generally able to perform compute operations that the computing devices of the physical assets 110 are unable to perform and/or may not have sufficient computing resources to perform. Exemplary local area compute nodes 130 may be described based on the disclosure herein, including but not limited to multicore computing device such as ARM, Intel or similar, may comprise gigabytes of local RAM storage, and terabytes of local hard disk storage. Local area compute nodes 130 are capable of running applications such inference engine, additional or standalone vision and video monitoring, predictive analytics, predictive maintenance, software defined networking functionality and automation. In one embodiment, the local area compute node devices 130 may compress or prepare data for transport via a vehicle for back haul. Local area compute nodes 130 may refer to, example and not by way of limitation, computing systems that are embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud or edge compute node, which may include one or more cloud components and one or more edge compute components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate. In one embodiment, local area compute nodes 130 may include network gateways, used to couple physical assets to other IoT devices and to cloud applications, for data storage, process control, and the like.

Cloud storage and cloud compute devices 160 may refer to Cloud storage and compute infrastructure of choice, such as Amazon AWS or Microsoft Azure. Offline, quasi real-time, and non-real time compute, analysis and business intelligence may reside and execute here.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 5:
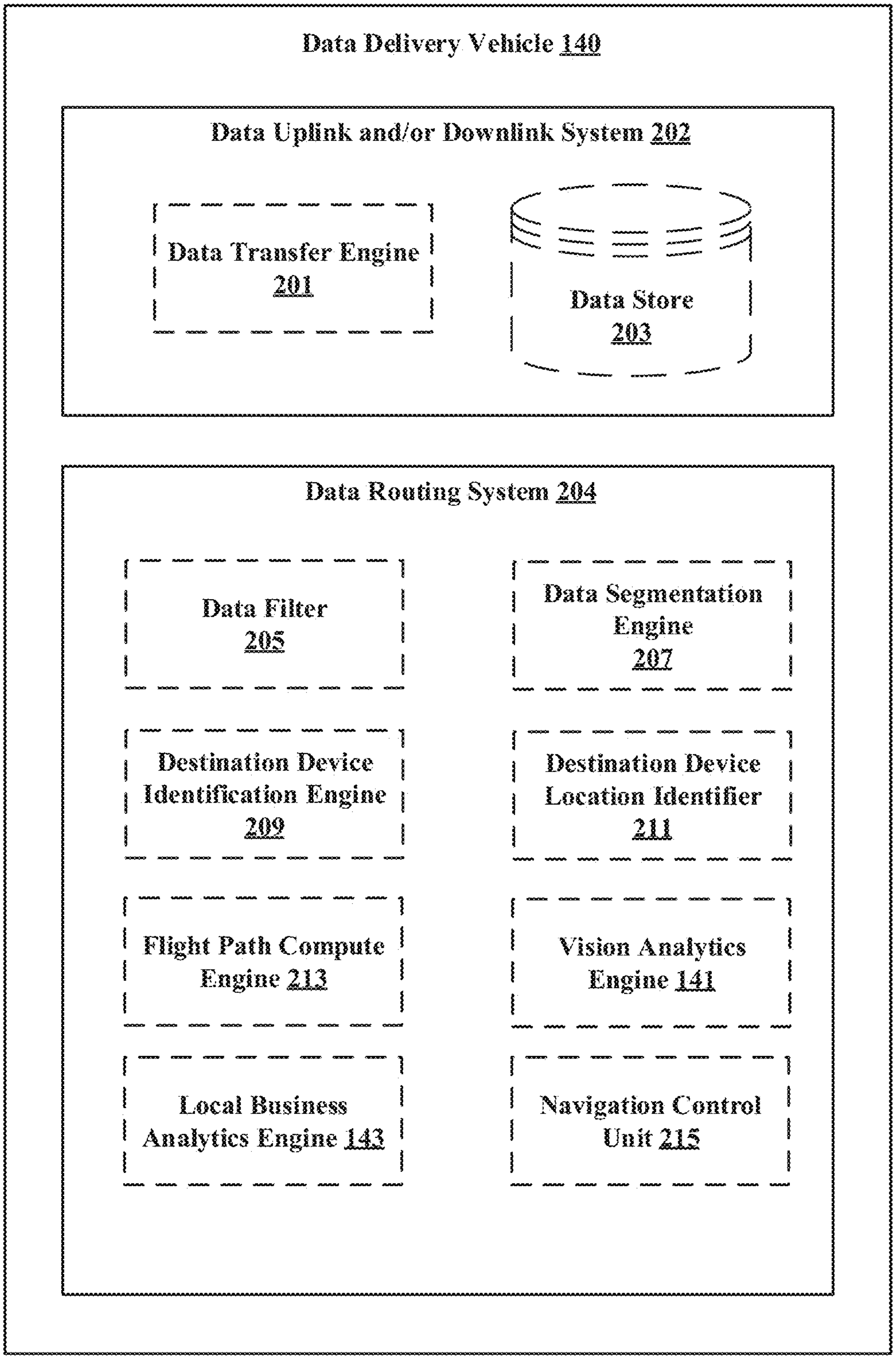
FIG. 5 illustrates an exemplary data delivery vehicle in accordance with an embodiment of the invention.

FIG. 5 illustrates an exemplary data delivery vehicle 140 in accordance with an embodiment of the invention. The data delivery vehicle 140 may comprise a data uplink and/or downlink system 202, and a data routing system 204. The data uplink and/or downlink system 202 may further comprise a data transfer engine 201 (shown as data collection and communication gateway 142 in FIG. 2) and a data store 203, a data routing system 204. The data routing system 204 may further comprise a data filter, a data segmentation engine 207, a destination device identification engine 209, a destination device location identifier 211, a flight path compute engine 213, vision analytics engine 141, navigation control unit 215, and local business analytics engine 143.

The data uplink and/or downlink system 202 interfaces with other devices illustrated in FIG. 1 to upload and/or download data to and/or from those devices. More specifically, the data transfer engine 201 interfaces with, for example, physical assets 110, local area compute node(s) 130 and/or the cloud compute node 160 to send and/or receive data to and/or from these devices. In one embodiment, the data transfer engine 201 may convert data for enabling communication using a variety of different communication protocols. For example, in one embodiment, the data transfer engine 201 may package some data for via Bluetooth communication protocols and may re-package the data for delivery via a local area networking protocol and/or cellular communication protocols, etc.

The data store 203 stores data that may be received by the transfer engine 201. A variety of data storage systems and technologies may be used, as would be understood by a person of ordinary skill in the art, without departing from the scope of the invention. In one embodiment, the data store 203 may also store a log of all data that is downloaded and/or uploaded by the data transfer engine. In one embodiment, the contents of the data store 203 may be deleted once the data is uploaded to a local area compute node 130 and/or the cloud compute node 160.

The data routing system 204 processes data and determines how to route the data to one or more other components described in reference to FIG. 4. In one embodiment, the data filter 205 of the data routing system 204 may filter the data that is received by the data transfer engine 201. The filtering step ensures that only data that is interesting for downstream processing is saved and/or uploaded to other devices, which helps reduce storage costs and bandwidth costs that may be associated with storing and/or transferring data for downstream processing. In one embodiment, the data filter 205 may filter data based on a variety of different factors or dimensions to filter data that may not be useful or may be detrimental to the local compute node 130 and/or the cloud compute node 160.

The data segmentation engine 207 segments data for upload to the local area compute node 130 and/or the cloud compute node. The segmentation process ensures that appropriate is sent to an appropriate compute node for further processing. For example, it would not be appropriate to send data that require real-time or near-real-time computation to an offline cloud compute node 160 that may not process the data in real-time or near-real-time. More broadly, in accordance with an embodiment of the invention, the data segmentation engine 207 may segment data by identifying data that should be processed in near real-time, wherein the data that should be processed in near real-time is tagged as local compute data. In another instance, the data segmentation engine 207 may identify data that does not require near-real-time response and tag that data as cloud compute data. In another instance, the data segmentation engine 207 may identify data sets that are less than a threshold size, wherein the data sets that are less than a threshold size are tagged as local compute data by the data segmentation engine 207. In another instance, the data segmentation engine 207 may identify data sets that are beyond that of the memory level of the local area compute node, wherein the data sets that are beyond the memory level of the local area compute node are tagged as cloud compute data. In another instance, the data segmentation engine 207 may identify data that exceeds the maximum capacity of the business intelligence products and tag that data as cloud compute data. In another instance, the data segmentation engine 207 may identify data that exceeds the maximum capacity of traditional database solutions and tag that data as cloud compute data. In another instance, the data segmentation engine 207 may identify data that uses distributed file systems for data storage and tag that data as cloud compute data. In another instance, the data segmentation engine 207 may identify data that requires map-reduce type technologies for analysis, and tag that data as cloud compute data.

In one embodiment of the invention, the data segmentation engine 207 may segment data based on several parameters, including but not limited to whether the data requires real-time analysis, the memory level required to process the data, whether the data can be post-processed, whether the data can be categorized as business intelligence data, and whether the data can be characterized as large-scale data. Real time data is often collected from sensors or physical assets 110 themselves. The real time data has the potential to be changing over time, often quite rapidly. To this end, rapid analytics are required to process the data in real time. Real time data may be tagged as local area network node data by the data segmentation engine 207. With regard to the memory level parameter, the data segmentation engine 207, may, for example, identify data sets wherein the size of the data is smaller than that of the memory available on the local area network compute node 130. At the time of this writing, local area compute clusters 130 can often be at the terabyte scale. Data sets that can be processed by memory available on local area network compute nodes 130 may be tagged as local area compute data. With regards to the post processing parameter, post processing or offline analysis which are capable of being performed by large scale systems such as HADOOP® are generally tagged as cloud compute data by the data segmentation engine 207. With respect to the business intelligence parameter, datasets that are less than a terabyte level can be tagged as local area compute data. This data can be used to discover business opportunities from the vast sets of data. Larger data may be tagged as cloud compute data and may be used in offline mode of operation to discover business opportunities. If the size of the data to be analyzed exceeds the maximum capacity of the business intelligence products and/or traditional database solutions, or if the data uses distributed file systems for data storage, and/or map-reduce type technologies for analysis, then the data may be tagged as cloud compute data.

In one embodiment of the invention, the data segmentation engine 207 tags data that is stored in the data store 203. In one embodiment, the tag data may be stored as metadata associated with the data that is stored in the data store 203. However, as would be apparent to others of skill in the art, other methods for tagging data may be used without departing from the scope of the invention. In one embodiment, the data tags identifies relevant data as the data is passed from one device to another within the system described in FIG. 1. Because the various devices within the system of FIG. 1 may communicate with each other, it is possible that the same data may be provide to one or more devices through different data routes. In some of those instances, data dedupe efforts may fail especially if the data is modified by a device as it is ingested or otherwise processed by one or more devices. In the same or other instances, it is desirable to reduce the amount of data that is transferred from one device to another to save on transmission costs and/or bandwidth loads. In those instances, the data tags enable a device to smartly identify data that has not been received by the device and receive only the data that has not passed through the device's memory. More specifically, the data segmentation engine 207 may, for example, tag harvest data that it is received from a harvester. If the same harvest data is sent to the data delivery vehicle 140 (but from a different source such as a tractor), then the previously received data may be rejected on the basis of the tags that are associated with data. In other instances, the tags may be used to dedupe the data more effectively.

The destination device identification engine 209 may identify destination devices that may be able to process the segmented data. In one embodiment, the destination device identification engine 209 may identify local area compute nodes 130 for processing local compute data. The destination device identification engine 209 may identify cloud compute nodes 160 for processing cloud compute data.

The destination device location identifier 211 may identify the location associated with a local area compute node 130 and/or cloud compute node. In one embodiment, the destination device location identifier 211 may identify local area compute nodes 130 that are capable of handling the size and type of data that is segmented as local compute data. In one embodiment, the destination device location identifier 211 may identify an area within cellular coverage for uploading and/or downloading data from the cloud compute node 160. In one embodiment, the destination device location identifier 211 may identify local area compute nodes 130 and/or cloud compute coverage area that is closest to the location of the data delivery vehicle 140.

The flight path compute engine 213 computes a flight path from the location the data delivery vehicle 140 to the local area compute node 130 and/or the cloud compute node 160 coverage area. In one embodiment, the flight path compute engine 213 may reference an external database to identify and compute a flight path from the location the data delivery vehicle 140 to the local area compute node 130 and/or a cellular connectivity region associated with the cloud compute node 160.

The navigation control unit 215 controls the mechanical components of the data delivery vehicle 140 to enable the data delivery vehicle 140 to travel along the computed flight path. A variety of control mechanisms and systems may be used, as would be understood by a person of ordinary skill in the art, without departing from the scope of the invention.

The vision analytics engine 141 and the local business analytics engine 143 are described in greater detail in reference to FIG. 2. That discussion is herein incorporated by reference.

Figure 10:
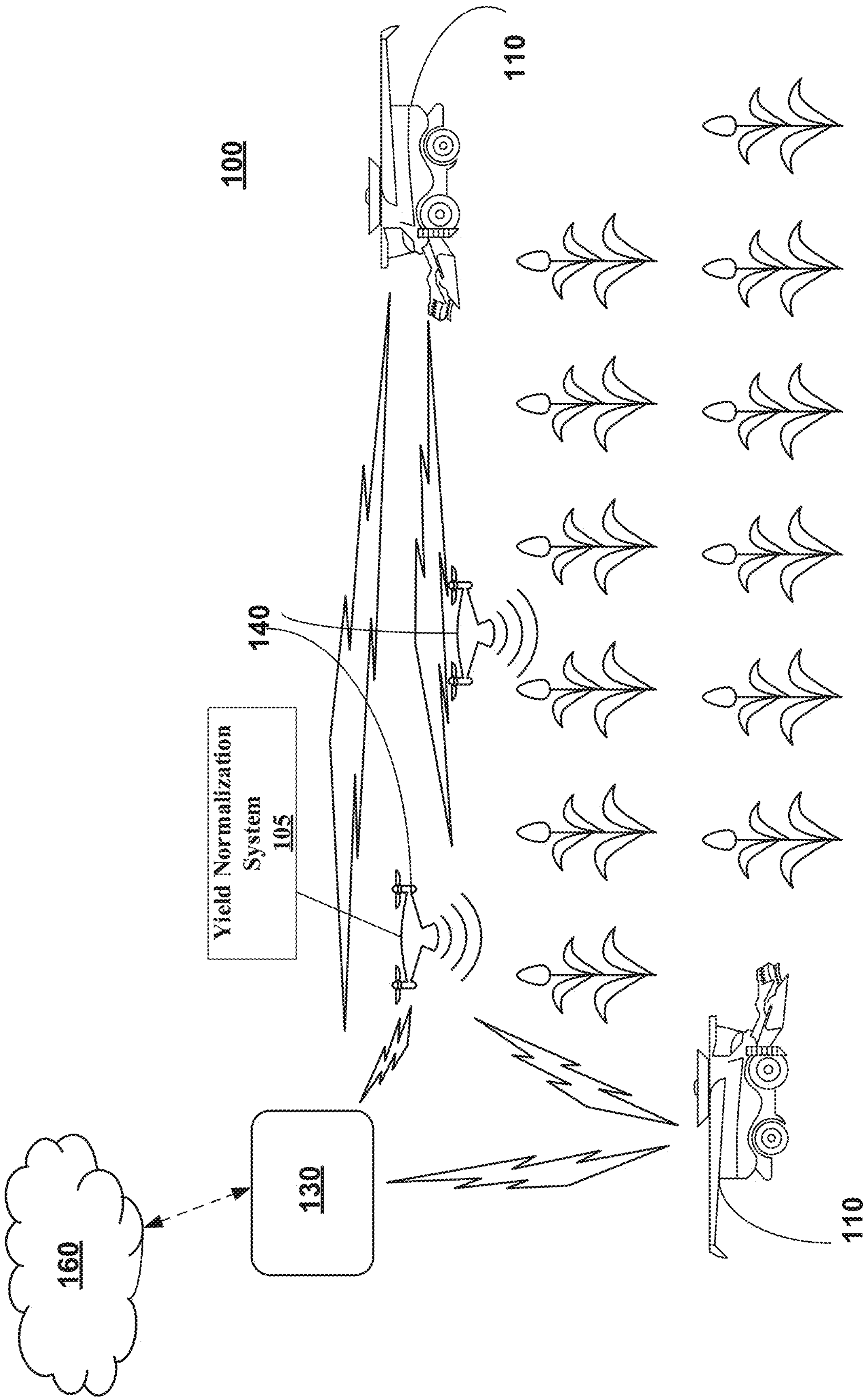
FIG. 10 illustrates, in an example embodiment, a data delivery vehicle deployment in a harvesting operational environment.

FIG. 10 illustrates, in an example embodiment, data delivery vehicle(s) 140 that are deployed in a harvesting operational environment 100. The system may comprise one or more data delivery vehicles 140, physical assets 110, edge of local network compute node 130, and cloud storage and compute infrastructure 160 (which are further described in reference to the above figures).

As illustrated in FIG. 10, the data delivery vehicle(s) 140 interfaces with physical assets 110, sensor suite that is on-board the data delivery vehicle(s) 140, and/or data obtained from the local area compute node 130 to obtain yield data for a given land tract or a farming area. In one embodiment, the data delivery vehicle(s) 140 comprises a yield normalization compute system that normalizes yield data received from, for example, the physical assets, on-board sensor suite, as well as data from the local area compute node 130. In other embodiments, the yield normalization system 105 may be at the local area compute node 130. In those instances, the data delivery vehicle(s) 140 may collect data from the on-board sensor suite and from physical assets 110 and travel to the local area compute node 130 to deliver the data for the yield normalization system 105 that may be at the local area compute node 130. In other embodiments, the yield normalization system 105 may be at the cloud storage and compute infrastructure 160. In those instances, the data delivery vehicle(s) 140 may collect data from the on-board sensor suite and from physical assets 110 and travel to the local area compute node 130 to deliver the data. The local area compute node 130 may transmit the data, along with edge compute data (if applicable) to the cloud storage and compute infrastructure 160 for yield normalization computation by the yield normalization system 105 that may be at the cloud storage and infrastructure node 160.

Physical assets 110, which may comprise, for example, harvester vehicles, may be deployed in a work environment, including a remote work environment, such as an agricultural field, a forestry harvesting operation, an open pit or partially underground mining operation, among other deployment contexts. Harvester vehicles 110 may initially be in direct satellite or other communications that identify and resolve the harvester's location and receive updates of its current location, enabling it to work autonomously as deployed. However, a common occurrence is that satellite communication signal paths between harvester vehicle and satellite may be interrupted or lost due to intervening events and features, such as due to occlusion from nearby crops, physical infrastructure such as walls, tall buildings, variation in topographical features, and even power loss or power degradation and similar malfunction events experienced at subcomponents of harvester vehicle 110. In the case of agriculture based deployments, physical assets 110 may include other sensor devices and/or other data sources such as cameras, multispectral sensors, sap flow sensors, temperature sensors, ambient humidity sensors, soil temperature sensors, soil moisture sensors, air velocity transducers, rain sensors, ground data based on flying drones that gather image data, and/or any other type of sensor device that may aid a farmer in determining how the farmer's crops are doing at any given time.

Physical assets 110 may transfer the collected data, computed data, monitored data and/or control data wirelessly to the data delivery vehicle(s) 140. A variety of different wireless communication systems and methodologies may be used to transfer data from the physical assets 110 to the data delivery vehicle 140, as would be apparent to a person of ordinary skill in the art, without departing from the scope of the invention. Various communications systems and methodologies are described in greater detail further below.

The data delivery vehicle 140 may be drones (however, they are not limited to drones), that are in communication with the physical assets 110 and may be used to transport data to various other computing devices in the exemplary network environment including local area nodes, cloud compute nodes, back haul networks, etc. In the absence of reasonable cellular network coverage (or other network) at the crop site, the data delivery vehicle(s) 140 essentially provide the network connectivity of an edge compute node to adjacent cellular network cells at periodic intervals. Upon joining a particular cell, data can be offloaded from the data delivery vehicle 140 to the local area compute node 130 and/or the cloud compute node 160 for further processing. In one embodiment, the data delivery vehicle(s) 140 may perform local area object recognition and movement analysis, multi-spectrum imagery collection and light weight processing using on-board sensor suite, which is described in further detail in reference to the other figures.

Local area compute nodes 130 generally refer to well-provisioned computing devices that are capable of sophisticated analysis. In other words, the computing systems of the local area compute nodes 130 are generally able to perform compute operations that the computing devices of the physical assets 110 are unable to perform and/or may not have sufficient computing resources to perform. Exemplary local area compute nodes 130 may be described based on the disclosure herein, including but not limited to, multicore computing device such as ARM, Intel or similar, may comprise gigabytes of local RAM storage, and terabytes of local hard disk storage. Local area compute nodes 130 are capable of running applications such as an inference engine, additional or standalone vision and video monitoring, predictive analytics, predictive maintenance, software defined networking functionality and automation. In one embodiment, the local area compute node devices 130 may compress or prepare data for transport via a vehicle for back haul. Local area compute nodes 130 may refer to, for example and not by way of limitation, computing systems that are an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the local area compute nodes 130 may include one or more computer systems; be unitary or distributed; span multiple locations; span multiple machines; or reside in a cloud or edge compute node, which may include one or more cloud components and one or more edge compute components in one or more networks. Where appropriate, one or more local area compute nodes 130 may perform without substantial spatial or temporal limitation one or more steps of one or more methods described or illustrated herein. As an example, and not by way of limitation, one or more local area compute nodes 130 may perform in real time or in batch mode one or more steps of one or more methods described or illustrated herein. One or more local area compute nodes 130 may perform at different times or at different locations one or more steps of one or more methods described or illustrated herein, where appropriate. In one embodiment, local area compute nodes 130 may include network gateways, used to couple physical assets to other IoT devices and to cloud applications, for data storage, process control, and the like.

Cloud storage and cloud compute devices 160 may refer to Cloud storage and compute infrastructure of choice, such as Amazon AWS or Microsoft Azure. Offline, quasi real-time, and non-real time compute, analysis and business intelligence may reside and execute here.

Although not illustrated in FIG. 10, network connectivity between and/or among the devices may be provided as described in reference to the other figures.

In particular embodiments, each system or engine may be a unitary server or may be a distributed server spanning multiple computers or multiple datacenters. Systems, engines, or modules may be of various types, such as, for example and without limitation, a web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types or may dynamically create or constitute files upon a request and communicate them to client devices or other devices in response to HTTP or other requests from client devices or other devices. A mail server is generally capable of providing electronic mail services to various client devices or other devices. A database server is generally capable of providing an interface for managing data stored in one or more data stores. The term "server" as used herein broadly encompasses other comparable but varying server computing device types, including raw data servers.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

Generally, techniques disclosed herein may be implemented on software, hardware or any combination of software and hardware. For example, they may be implemented in an operating system kernel, in a separate user process, in a library package bound into network applications, on a specially constructed machine, on an application-specific integrated circuit (ASIC), or on a network interface card, FPGA or GPU.

Figure 11:
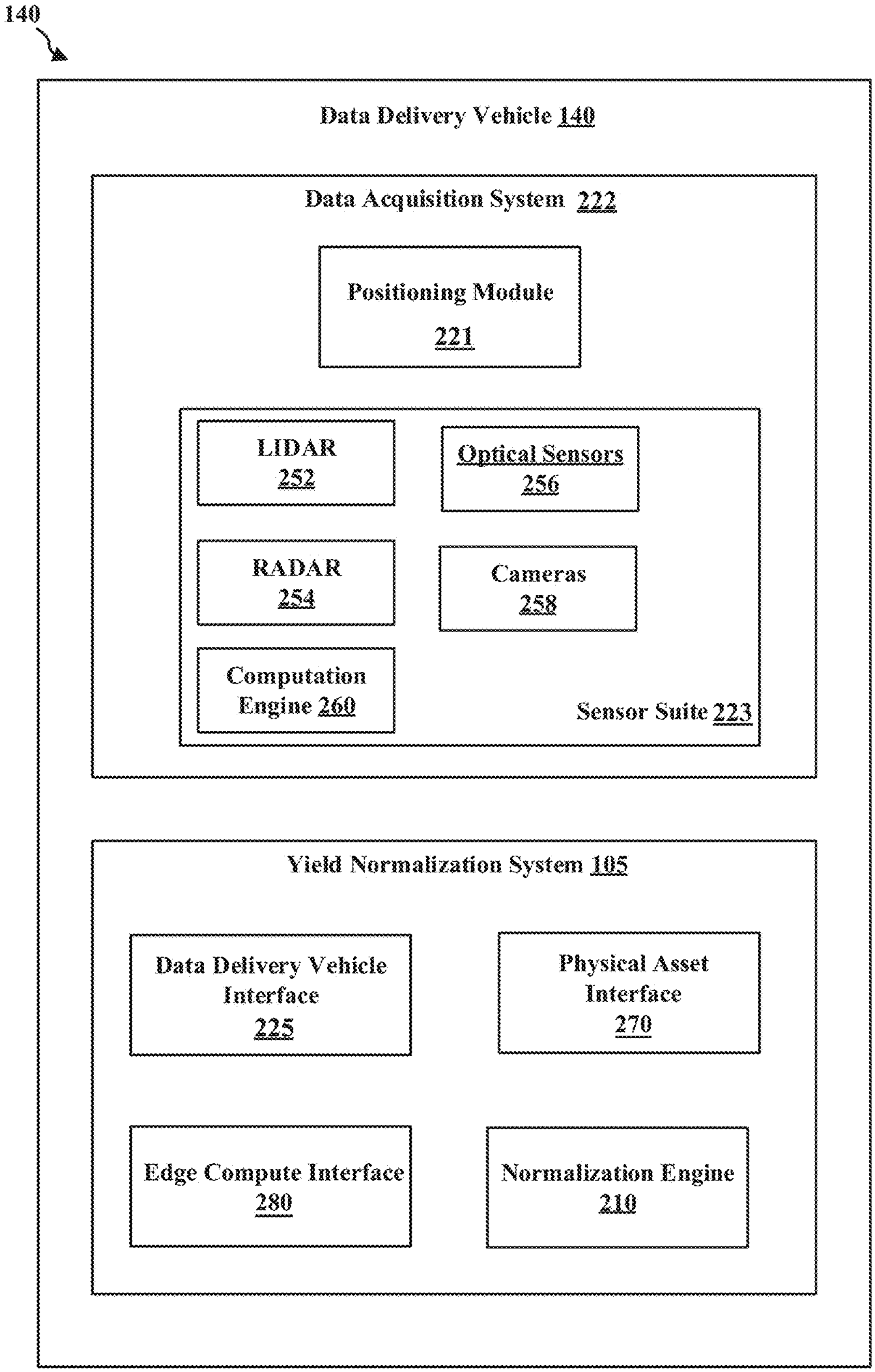
FIG. 11 illustrates, in an example embodiment, a system architecture operative to maintain communication among vehicles and network infrastructure in a harvesting operational environment.

FIG. 11 illustrates an example data delivery vehicle 140 in greater detail in accordance with an embodiment of the disclosure herein. The data delivery vehicle 140 may include a data acquisition system 222, and yield normalization system 105.

The data acquisition system 222 of data delivery vehicle 140 may further comprise a positioning module 221 and a sensor suite 223. In one embodiment, the positioning module 221 obtains location information associated with the data delivery vehicle 140. In other embodiments, the positioning module 221 may obtain the location information associated with physical assets 110 and/or relative location information associated with the physical assets 110. The positioning module 221 may communicate with global navigation satellite systems (GNSS) such as, but not limited to, GPS, GLONASS, BDS, GALILEO, QZSS, IRNSS, etc. In this manner, the positioning module 221 may obtain its relative and/or absolute location data based on techniques known in the art.

In one embodiment, the positioning module 221 may compute or derive relative and/or absolute location of physical assets 110. In some of those embodiments, the positioning module 221 may use the data obtained from global navigation satellite systems and from the sensor suite 223 to derive relative and/or absolute location of the physical assets 110 using a variety of different techniques. For example, the positioning module 221 may derive the data delivery vehicle's 140 location by communicating with global navigation satellite systems, and may compute or derive the relative and/or absolute location of physical assets 110 by for example computing a distance between the data delivery vehicle 140 and physical assets 110 via sensors/sensor suite 223 that are on-board the data delivery vehicle 140. In other words, the data delivery vehicle 140 may traverse three-dimensional space to a location where it can locate the physical asset 110 via the sensor, compute its location or distance relative to the data delivery vehicle 140 and compute the physical asset's 110 absolute location. In one embodiment, the data delivery vehicle 140 may resolve its location via the positioning module 221, and via a camera, compute the distance between the data delivery vehicle 140 and the physical asset 110, and then compute the absolute location of the physical asset 110. The position module 221 may be embodied in one or more processor and non-transitory memory storage devices storing instructions executable to instantiate functionality of positioning module 221; it can include processor-executable instructions for processing the processes described herein. In one embodiment, the positioning module 221 may follow a physical asset 110 (such as a vehicle or a combine, harvester, etc.) as the vehicles progress or advance in a sequence of positions during the harvesting operation within a targeted harvesting area or region. In embodiments, harvester vehicles 110 can be assigned specific operational sub-areas or portions within an identified harvesting area, such that the overall harvesting is cooperatively accomplished in unison, in accordance with the portions as respectively assigned, the harvesting operations being performed at least partially concurrently. In embodiments, the data delivery vehicle 140 may initially be paired or docked with, or within, the harvester vehicle 110, with the harvester vehicle 110 then launched upon commencement of harvesting operations. In other embodiments, data delivery vehicle 140 may be launched upon certain conditions being encountered during harvesting. For example, adverse conditions that directly affect communications between harvester vehicle 110 and satellite or other communications system, such as due to intervening and signal-occluding topographical, agricultural and other infrastructure features, whereupon detecting resultant degradation or loss of communication signal quality, the data delivery vehicle 140 may be launched aerially in separation from harvester vehicle. Such loss or degradation of communication signals can also be precipitated, in addition to occlusion events, by loss or degradation of operating power in the communication infrastructure incorporated within harvester vehicle or some subcomponents or subassemblies. In additional embodiments, after launch, the data delivery vehicle 140 can autonomously navigate in 3-dimensional space to a location that re-establishes communication with cloud server 160, for instance based on satellite communication. In one embodiment, the sensor suite 223 is used for locating the harvester vehicle 110 in progressive advancement during a harvesting operation and establishing or maintaining uni- or bi-directional wireless communications therewith. In one embodiment, the data delivery vehicle 140 may locate, and establish a position of the harvester vehicle 110 via a local coordinate scheme or system particular to that specific vehicles' pairing. Similarly, once the position of the harvester vehicle 110 is determined by the data delivery vehicle 140, that positioning information may be communicated to the harvester vehicle 110 in a wireless or radio-based communication protocol that is particular to a given vehicle pairing. In this manner, the harvester vehicle 110 may continue its operational deployment in an autonomous manner, while its position may be kept updated and corrected at regular intervals, whether predetermined intervals or otherwise adaptively adjusted during operational deployment of the harvester vehicle 110. In some cases, the position vector defining the distance and direction of the data delivery vehicle 140, as acquired and measured using its embedded sensor devices, to the harvester vehicle(s) 110 may be expressed according to a global or a more particular local coordinate system. It is contemplated that mathematical-based techniques of determining relative geo-positioning between data delivery vehicle 140 and harvester vehicle(s) 110 may be implemented, using any combination of hardware and/or software algorithm, as will be apparent to those of skill in the art.

The sensor suite 223 may comprise one or more sensors, including, but not limited to, light detection and ranging (LIDAR) sensor devices 252, radio detection and ranging (RADAR) sensor devices 254, infrared optical sensor devices 256, one or more camera devices 258, and a computation engine 260 for processing the data obtained or output by the one or more sensors within the sensor suite 223.

The one or more camera devices 258 may comprise one or more cameras. In one embodiment, the camera devices 258 may comprise high-resolution cameras that capture images and/or videos around the data delivery vehicle 140. In contexts where the camera device 258 is deployed in agricultural contexts, the camera devices 258 capture image and/or video (comprising audio and/or visual data) of crops that are around the data delivery vehicle 140. In some instances, the camera devices 258 may capture digital data of crops as the data delivery vehicle 140 traverses three-dimensional spaces.

The LIDAR sensor device 252 may comprise one or more LIDAR sensors. The LIDAR sensor device 252 may capture a variety of different details around the data delivery vehicles 140. Generally, the LIDAR sensor device 252 may use laser technology to measure distance data between the data delivery vehicle 140 and one or more objects around the data delivery vehicle 140. In one embodiment, the LIDAR sensor device 252 may obtain distance data between the LIDAR sensor device 252 and/or the data delivery vehicle 140 and a crop and/or a stalk of crop, etc. The computation engine 260 may compute the height of a crop and/or the height of a stalk of a crop based on elevation data that may be obtained from an on-board sensor, and the distance between the LIDAR sensor device 252 and crops and/or stalks of crop. The LIDAR sensors may be used to measure other details in other contexts, such as construction, etc.

The RADAR sensor device 254 may comprise one or more RADAR sensors. The RADAR sensor device 254 may capture a variety of different details around the data delivery vehicles 140. Generally, the RADAR sensor device 254 may use radio technology to measure distance data between the data delivery vehicle 140 and one or more objects around the data delivery vehicle 140. In one embodiment, the RADAR sensor device 254 may obtain data related to distances between crops, stalks of crop, etc. The computation engine 260 may compute the density of stalks of the crop within a portion of the land tract based on the obtained data related to distances between stalks of crop. The RADAR sensors may be used to measure other details in other contexts, such as construction, etc.

The one or more optical sensors 256 may comprise any sensor used to convert light into data. The one or more optical sensors 256 may detect light within a certain range of wavelengths, such as infrared light, visible light, ultraviolet light, etc. The one or more optical sensors 256 may detect light. The one or more optical sensors 256 may detect changes in light. The one or more optical sensors 256 may detect light and/or changes in light related to crops. For example, the one or more optical sensors 256 may determine a heat signature and/or a change in heat signature for a particular crop or group of crops.

In one embodiment, the computation engine 260 may process the data captured by the LIDAR sensor device 252, RADAR sensor device 254, one or more optical sensors 256, and/or one or more camera devices 258 and may compute, for example, the number of corn stalks within a land tract and/or within a given patch or rows crops. In some embodiments, the computation engine 260 may compute a number of cars on a stalk (for example, but not limited to, a stalk of corn, soybeans, etc.). In some embodiments, the computation engine 260 may compute physical characteristics of the crop. For example, the computation engine 260 may compute the height of individual stalks within a given row or patch of crop and/or the size or average size of seeds or grain on the stalks. The computation engine 260 may be trained on, for example, crop data (training data). The computation engine 260 may make decisions about crops, such as number, size, viability, etc. based on a comparison of data from sensors with training data. The computation methodologies may be known by persons of ordinary skill in the art, and incorporated into this disclosure, without departing from the scope of the invention.

The one or more optical sensors 256, one or more camera devices 258, LIDAR sensor device 252, and/or RADAR sensor device 254 may record data indicative of physical details of the crop under harvest by the harvesting vehicles 110. In the case where the crop is a cornfield, a high resolution camera of the one or more camera devices 258 of data delivery vehicle 140 may record data indicative of the number of corn stalks in a given patch or rows of crop, and a number of cars of corn on the corn stalk as harvesting progresses. An infrared sensor of the one or more optical sensors 256 may record data indicative of a heat signature related to viability and amount of corn. The LIDAR sensor device 252 may record data indicative of physical characteristics of the crop, such as the height of individual stalks within a given row or patch of crop. The RADAR sensor device 254 may record data indicative of additional physical crop characteristics data including a relative position of a given stalk and the density of stalks within a given row or patch of crop. The computation engine 260 may receive data from one or more of the one or more optical sensors 256, one or more camera devices 258, LIDAR sensor device 252, and/or RADAR sensor device 254 and make deductions and/or estimations about the corn harvest.

The yield normalization system 105 may normalize data sent by the data delivery vehicles 140 into a normalized data set such that data from the data delivery vehicles 140 may be compared. The yield normalization system 105 may comprise a data delivery vehicle interface 225, a physical asset interface 270, an edge compute interface 280, and a normalization engine 210. Although the yield normalization system 105 is shown in one of the data delivery vehicles 140, in other embodiments the yield normalization system 105 may by somewhere else, such as the local area compute node(s) 130, the cloud compute node 160, etc. In such other embodiments, the yield normalization system 105 may comprise the normalization engine 210, along with other appropriate interfaces.

The data delivery vehicle interface 225 may receive messages via a messaging protocol and prepare the messages in a manner suitable for consumption by the data delivery vehicle 140. The data delivery vehicle interface 225 may receive information in a format usable by the data delivery vehicle 140 and prepare the messages in a suitable messaging protocol. The data delivery vehicle interface 225 may send and/or receive messages across a network, such as the network 150. The data delivery vehicle interface 225 may send and/or receive messages directly to another computing device, such as another data delivery vehicle 140, a physical asset 110, the cloud server 160, etc. The data delivery vehicle interface 225 may send and/or receive messages arranged according to any standard, such as, Internet Protocol (IP), Wi-Fi, Bluetooth, etc.

The physical asset interface 270 may facilitate the transfer of information between a data delivery vehicle 140 and a physical asset 110. The physical asset interface 270 may convert outgoing messages from a format accessible by the data delivery vehicle 140 into a format accessible by the physical asset 110. The physical asset interface 207 may convert incoming messages from a format accessible by the physical asset 110 into a format accessible by the data delivery vehicle 140. The physical asset interface 270 may send and/or receive messages arranged according to any standard, such as, Internet Protocol (IP), Wi-Fi, Bluetooth, etc.

The edge compute interface 280 may facilitate the transfer of information between a data delivery vehicle 140 and the local area compute node(s) 130. The edge compute interface 280 may convert outgoing messages from a format accessible by the data delivery vehicle 140 into a format accessible by the local area compute node(s) 130. The edge compute interface 280 may convert incoming messages from a format accessible by the local area compute node(s) 130 into a format accessible by the data delivery vehicle 140. The edge compute interface 280 may send and/or receive messages arranged according to any standard, such as, Internet Protocol (IP), Wi-Fi, Bluetooth, etc.

The normalization engine 210 may normalize data received from sensors in the sensor suite 223, data received from the data delivery vehicle interface 225, data received from the physical asset interface 207, and/or data received from the edge compute interface 280. The normalization engine 210 may normalize data received from different types of sources. The normalization engine 210 may normalize data received from different sources. The normalization engine 210 may normalize data received from different locations. The normalization engine 210 may normalize data received at different times. The normalization engine 210 may reduce or eliminate differences in data based on different calibration settings on sensors and/or monitors. The normalization engine 210 may reduce or eliminate "zebra-striped" data. The normalization engine 210 may reduce or eliminate noise in data.

Figure 12:
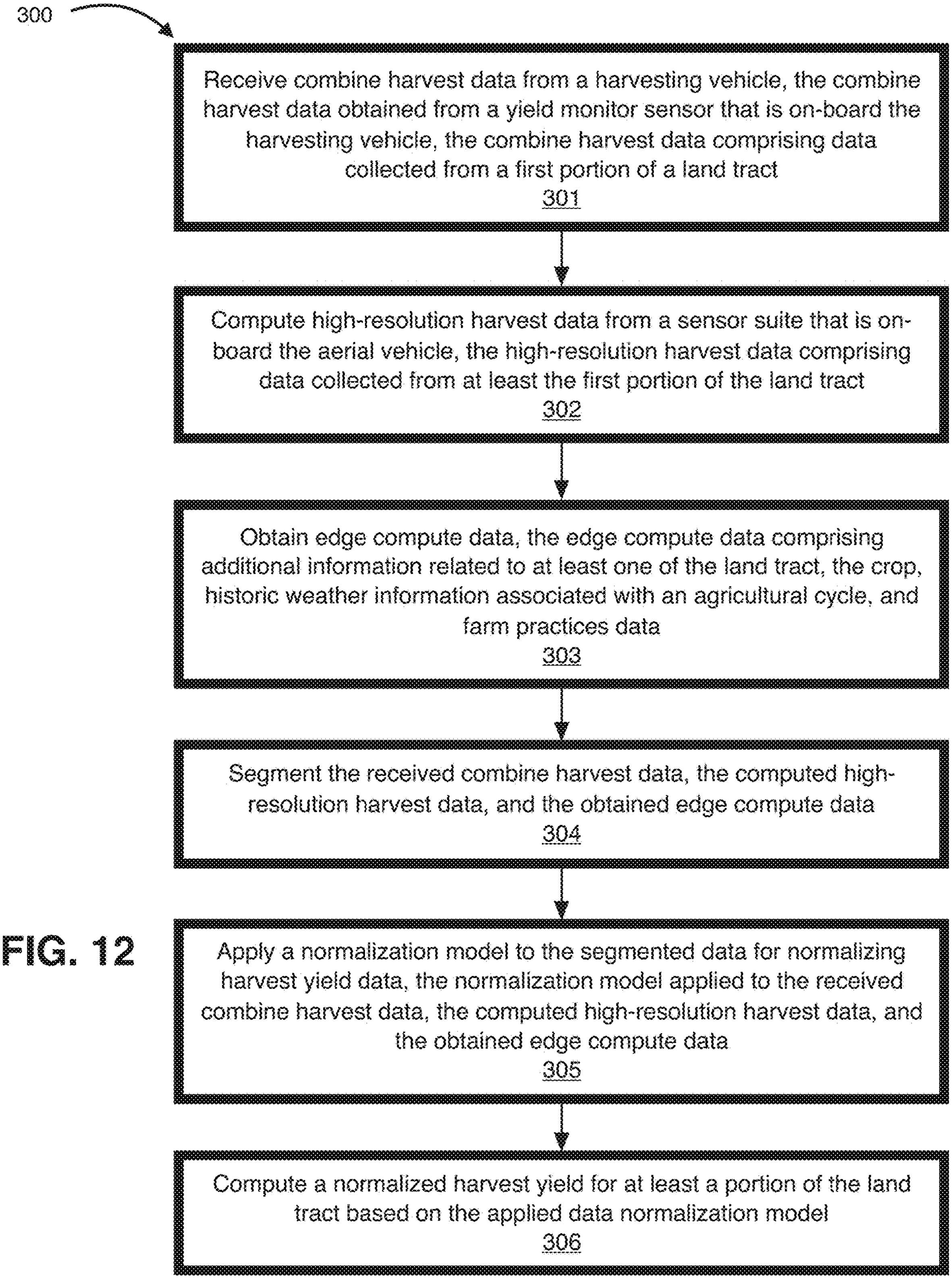
FIG. 12 illustrates an example embodiment of a computer implemented method based on a data delivery vehicle deployment in a harvesting operational environment.

FIG. 12 illustrates, in an example embodiment, method 300 of normalizing harvest yield data from an operation for harvesting crops. In embodiments, the method steps or techniques depicted and described herein can be performed in a processor of the data delivery vehicle 140, the method steps being encoded as processor-executable instructions in a non-transitory memory of the data delivery vehicle 140. The data delivery vehicle 140 may comprise an aerial data delivery vehicle 140. In some embodiments, the techniques disclosed in reference to FIG. 12 can be implemented at least partially in hardware or any combination of software and hardware to manifest functionalities described, and also in conjunction with, or combined with portions of techniques or sub-steps as described in FIG. 13. The techniques of FIG. 12 may be implemented in an operating system kernel, in a separate user process, in a library package bound into network applications, on a specially constructed machine, on an application-specific integrated circuit (ASIC), or a field programmable gate array (FPGA).

At step 301, combine harvest data may be received from a harvesting vehicle. The combine harvest data may be obtained from a yield monitor sensor that is on-board the harvesting vehicle. The combine harvest data may comprise data collected from a first portion of a land tract. In embodiments, the yield monitor sensor that is on-board a harvesting vehicle may measure at least one of a weight and mass associated with crops that are harvested by the harvesting vehicle. In embodiments, the yield monitor sensor that is on-board a harvesting vehicle may comprise at least one of an impact plate that measures a weight of crops that are harvested by the harvesting vehicle, and an optical sensor that measures a volume of crops that are harvested by the harvesting vehicle. In embodiments, the yield monitor sensor that is on-board a harvesting vehicle may comprise a location monitor that resolves a location of the harvesting vehicle. The location data may be associated with the combine harvest data to determine combine harvest data for a portion of the land tract.

At step 302, high-resolution harvest data may be computed from a sensor suite that is on-board the aerial vehicle. The high-resolution harvest data may comprise data collected from at least the first portion of the land tract. In embodiments, the sensor suite that is on-board the aerial vehicle may comprise at least one of a high-resolution camera, a light detection and ranging ("LIDAR") sensor, a radio detection and ranging ("RADAR") sensor device, and an infrared optical sensor. In embodiments, the high-resolution camera may measure at least one of a number of cars on a stalk of the crop and the size of the cars on a stalk of the crop. In embodiments, LIDAR may measure a height of a stalk of the crop. In embodiments, the RADAR may measure at least one of a position of stalk of the crop relative to each other, and the density of stalks of the crop within a portion of the land tract. In embodiments, the sensor suite that is on-board the aerial vehicle may comprise a means for computing a location associated with each measurement obtained by the sensor suite.

At step 303, edge compute data may be obtained. The edge compute data may comprise additional information related to at least one of the land tract, the crop, historic weather information associated with an agricultural cycle, and farm practices data. In embodiments, the land tract data associated with the obtained edge computing data may comprise historical yield data associated with at least a portion of the land tract. In embodiments, the crop data associated with the obtained edge computing data may comprise historic data associated with a seed varietal that is planted in at least a portion of the land tract. The historical data may comprise at least one of expected height of a stalk of the crop, expected number of cars on a stalk of the crop, and the expected size of cars on a stalk of the crop. In embodiments, the historic weather information associated with the obtained edge computing data may comprise at least one of average rainfall data associated with the agricultural cycle. In embodiments, farm practices data associated with the obtained edge computing data may comprise at least one of fertility program data, tillage program data, and crop protection program data.

At step 304, the received combine harvest data, the computed high-resolution harvest data, and the obtained edge compute data may be segmented. In embodiments, segmenting the data may comprise identifying a location associated with each received combine harvest data, and the computed high-resolution harvest data. In embodiments, segmenting the data may comprise identifying combine harvest data and high-resolution harvest data that is associated with a portion of the land tract.

At step 305, a normalization model may be applied to the segmented data for normalizing harvest yield data. The normalization model may be applied to the received combine harvest data, the computed high-resolution harvest data, and the obtained edge compute data.

At step 306, a normalized harvest yield may be computed for at least a portion of the land tract based on the applied data normalization model. In embodiments, the computed normalized harvest yield data may be sent to a computing device for generating recommendations for obtaining optimal yield.

In embodiments, near real-time data associated with at least one of the land tract, the crop, and weather information may be obtained. A data normalization model for normalizing harvest yield data based on the received combine harvest data, the computed high-resolution harvest data, the obtained edge compute data, and the obtained near real-time data may be applied.

In embodiments, the harvesting vehicle may be a first harvesting vehicle. The normalization model may be applied to the segmented data for normalizing harvest yield data. The normalization model may be applied to received combine harvest data of the first and a second harvesting vehicles, the computed high-resolution harvest data, and the obtained edge compute data.

Figure 13:
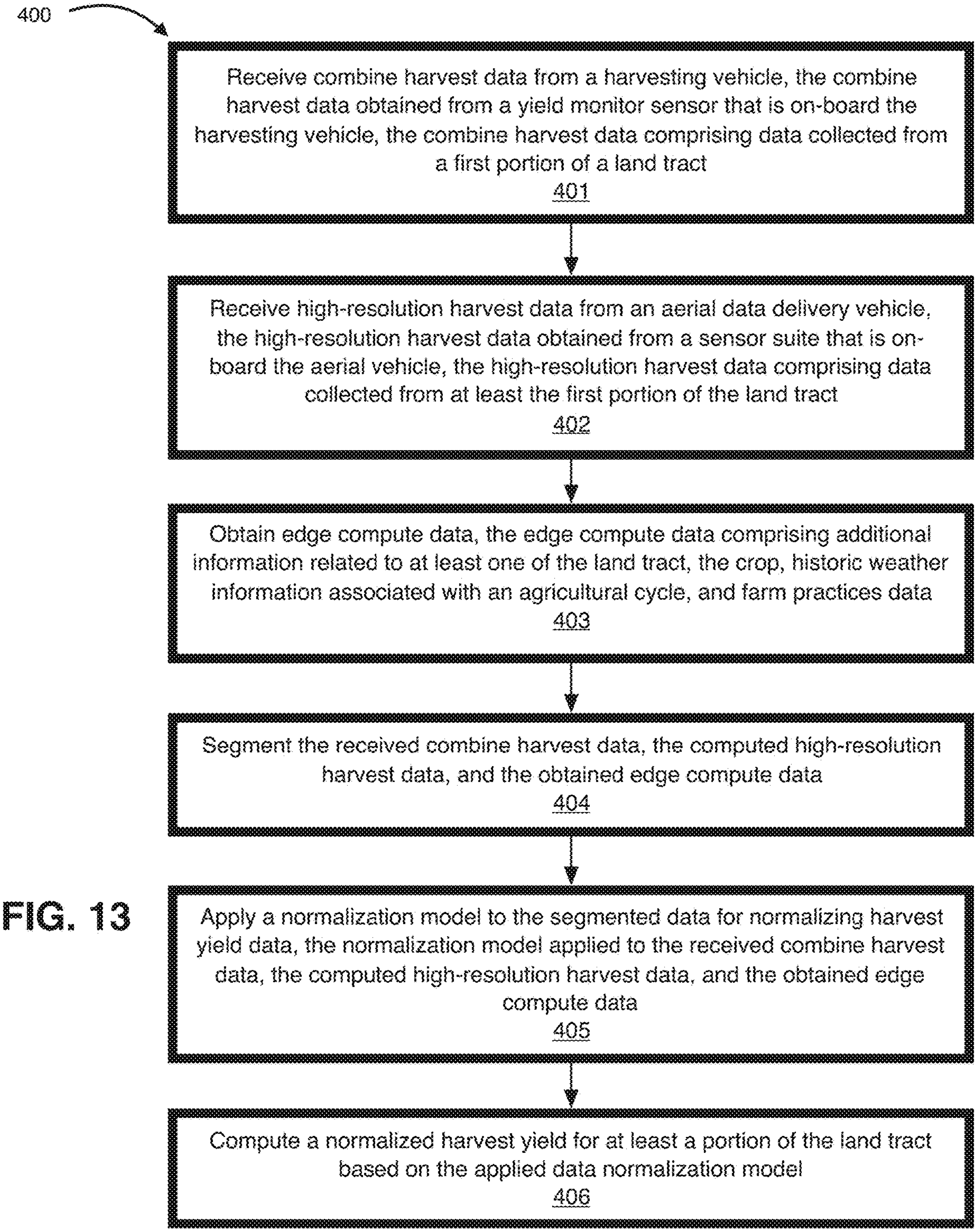
FIG. 13 illustrates, in an example embodiment, a method of generating an aggregated harvesting yield based on a data delivery vehicle deployment in a harvesting operational environment.

FIG. 13 illustrates, in an example embodiment, method 400 of normalizing harvest yield data from an operation for harvesting crops. In embodiments, the method steps or techniques depicted and described herein can be performed in a processor of the data delivery vehicle 140, the method steps being encoded as processor-executable instructions in a non-transitory memory of the data delivery vehicle 140. In embodiments, the method steps or techniques depicted and described herein can be performed in a processor the local area compute node(s) 130, the method steps being encoded as processor-executable instructions in a non-transitory memory of the local area compute node(s) 130. In embodiments, the method steps or techniques depicted and described herein can be performed in a processor of the cloud compute node 160, the method steps being encoded as processor-executable instructions in a non-transitory memory of the cloud compute node 160. In embodiments, the method steps or techniques depicted and described herein can be performed in a processor of a remote computer accessible by the network 150, the method steps being encoded as processor-executable instructions in a non-transitory memory of the remote computer accessible by the network 150. In some embodiments, the techniques disclosed in reference to FIG. 13 can be implemented at least partially in hardware or any combination of software and hardware to manifest functionalities described, and also in conjunction with, or combined with portions of techniques or sub-steps as described in FIG. 12. The techniques of FIG. 13 may be implemented in an operating system kernel, in a separate user process, in a library package bound into network applications, on a specially constructed machine, on an application-specific integrated circuit (ASIC), or a field programmable gate array (FPGA).

At step 401, combine harvest data may be received from a harvesting vehicle. The combine harvest data may be obtained from a yield monitor sensor that is on-board the harvesting vehicle. The combine harvest data may comprise data collected from a first portion of a land tract. In embodiments, the yield monitor sensor that is on-board a harvesting vehicle may measure at least one of a weight and mass associated with crops that are harvested by the harvesting vehicle. In embodiments, the yield monitor sensor that is on-board a harvesting vehicle may comprise at least one of an impact pate that measures a weight of crops that are harvested by the harvesting vehicle, and an optical sensor that measures a volume of crops that are harvested by the harvesting vehicle. In embodiments, the yield monitor sensor that is on-board a harvesting vehicle may comprise a location monitor that resolves a location of the harvesting vehicle. The location data may be associated with the combine harvest data to determine combine harvest data for a portion of the land tract.

At step 402, high-resolution harvest data may be received from an aerial data delivery vehicle. The high-resolution harvest data may be obtained from a sensor suite that is on-board the aerial vehicle. The high-resolution harvest data may comprise data collected from at least the first portion of the land tract. In embodiments, the sensor suite that is on-board the aerial vehicle may comprise at least one of a high-resolution camera, a light detection and ranging ("LIDAR") sensor, a radio detection and ranging ("RADAR") sensor device, and an infrared optical sensor. In embodiments, the high-resolution camera may measure at least one of a number of cars on a stalk of the crop and the size of the cars on a stalk of the crop. In embodiments, LIDAR may measure a height of a stalk of the crop. In embodiments, the RADAR may measure at least one of a position of stalk of the crop relative to each other, and the density of stalks of the crop within a portion of the land tract. In embodiments, the sensor suite that is on-board the aerial vehicle may comprise a means for computing a location associated with each measurement obtained by the sensor suite.

At step 403, edge compute data may be obtained. The edge compute data may comprise additional information related to at least one of the land tract, the crop, historic weather information associated with an agricultural cycle, and farm practices data. In embodiments, the land tract data associated with the obtained edge computing data may comprise historical yield data associated with at least a portion of the land tract. In embodiments, the crop data associated with the obtained edge computing data may comprise historic data associated with a seed varietal that is planted in at least a portion of the land tract. The historical data may comprise at least one of expected height of a stalk of the crop, expected number of cars on a stalk of the crop, and the expected size of cars on a stalk of the crop. In embodiments, the historic weather information associated with the obtained edge computing data may comprise at least one of average rainfall data associated with the agricultural cycle. In embodiments, farm practices data associated with the obtained edge computing data may comprise at least one of fertility program data, tillage program data, and crop protection program data.

At step 404, the received combine harvest data, the received high-resolution harvest data, and the obtained edge compute data may be segmented. In embodiments, segmenting the data may comprise identifying a location associated with each received combine harvest data, and the received high-resolution harvest data. In embodiments, segmenting the data may comprise identifying combine harvest data and high-resolution harvest data that is associated with a portion of the land tract.

At step 405, a normalization model may be applied to the segmented data for normalizing harvest yield data. The normalization model may be applied to the received combine harvest data, the received high-resolution harvest data, and the obtained edge compute data.

At step 406, a normalized harvest yield may be computed for at least a portion of the land tract based on the applied data normalization model. In embodiments, the computed normalized harvest yield data may be sent to a computing device for generating recommendations for obtaining optimal yield.

In embodiments, near real-time data associated with at least one of the land tract, the crop, and weather information may be obtained. A data normalization model for normalizing harvest yield data based on the received combine harvest data, the received high-resolution harvest data, the obtained edge compute data, and the obtained near real-time data may be applied.

In embodiments, the harvesting vehicle may be a first harvesting vehicle. The normalization model may be applied to the segmented data for normalizing harvest yield data. The normalization model may be applied to received combine harvest data of the first and a second harvesting vehicles, the received high-resolution harvest data, and the obtained edge compute data.

Figure 14:
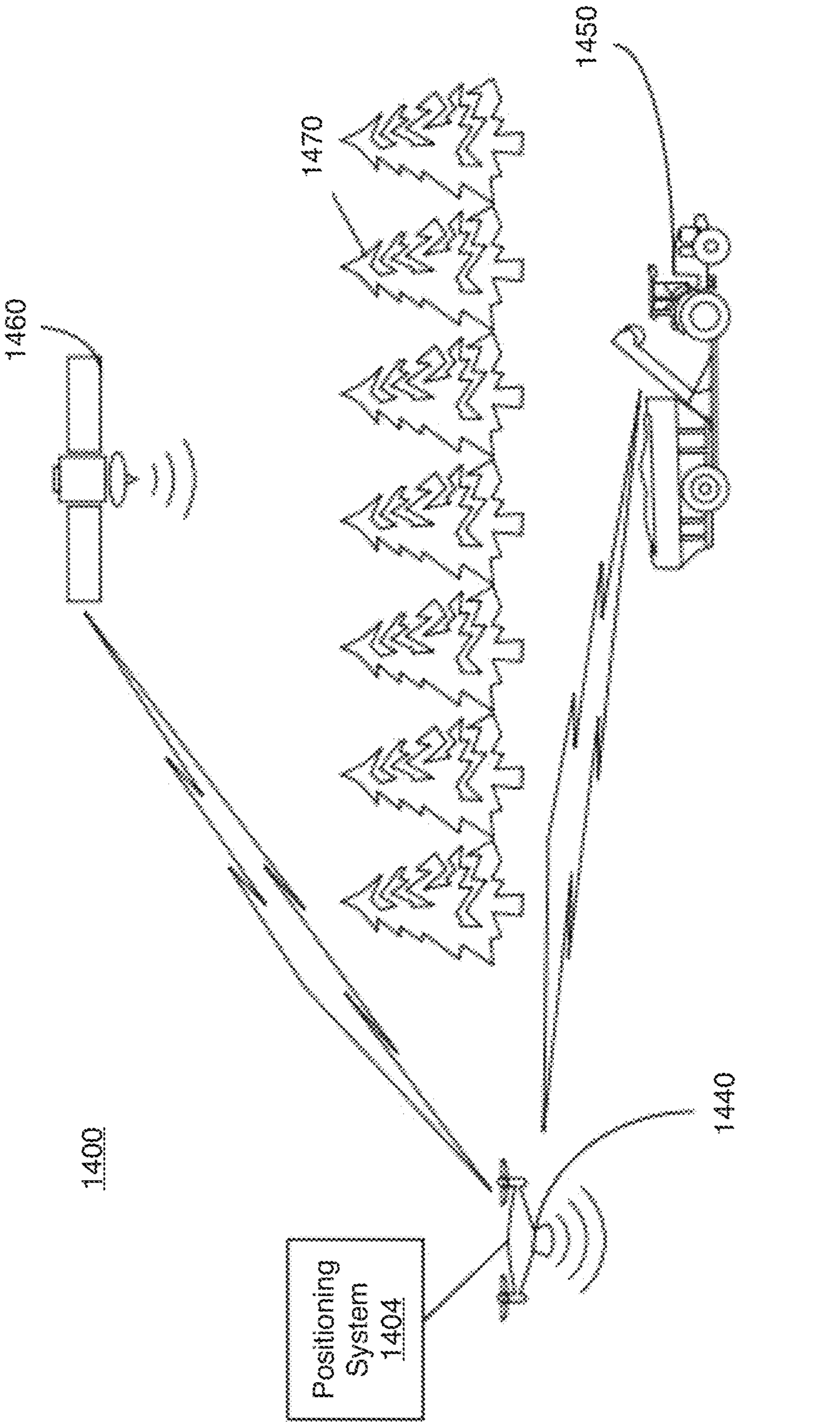
FIG. 14 illustrates, in an example embodiment, obtaining location data in an operational environment.

FIG. 14 illustrates, in an example embodiment, an operational environment 1400. The operational environment 1400 may comprise one or more data delivery vehicles 1440, physical assets (e.g., ground vehicles, remote vehicles, harvesters, combines, etc.) 1450, satellites 1460, and obstructions 1470. Each of the one or more data delivery vehicles 1440 may comprise a positioning system 1404, as described in more detail in reference to FIG. 15.

The satellites 1460 may deliver signals comprising location data to the one or more data delivery vehicles 1440. The satellites 1460 may deliver signals comprising location data to the one or more physical assets 1450. For example, the satellites 1460 may deliver signals comprising data used to determine a set of global navigation satellite system (GNSS) coordinates.

The obstructions 1470 may prevent one or more satellites 1460 from delivering signals to the one or more physical assets 1450. The obstructions may comprise a line of trees, a mountain, a man-made structure, or any object or combination of objects preventing signals from the one or more satellites 1460 from being delivered to the one or more physical assets 1450.

In an aspect, the one or more data delivery vehicles 1440 may dock with the one or more physical assets 1450. On detection of a failure of an associated physical asset to receive adequate signals from the one or more satellites

1460, a data delivery vehicle 1440 may launch from the associated physical asset 1450.

Physical assets 110, which may comprise, for example, harvester vehicles, may be deployed in a work environment, including a remote work environment, such as an agricultural field, a forestry harvesting operation, an open pit or partially underground mining operation, among other deployment contexts. Harvester vehicles 110 may initially be in direct satellite or other communications that identify and resolve the harvester's location and receive updates of its current location, enabling it to work autonomously as deployed. However, a common occurrence is that satellite communication signal paths between harvester vehicle and satellite may be interrupted or lost due to intervening events and features, such as due to occlusion from nearby crops, physical infrastructure such as walls, tall buildings, variation in topographical features, and even power loss or power degradation and similar malfunction events experienced at subcomponents of harvester vehicle 110. In the case of agriculture based deployments, physical assets 110 may include other sensor devices and/or other data sources such as cameras, multispectral sensors, sap flow sensors, temperature sensors, ambient humidity sensors, soil temperature sensors, soil moisture sensors, air velocity transducers, rain sensors, ground data based on flying drones that gather image data, and/or any other type of sensor device that may aid a farmer in determining how the farmer's crops are doing at any given time.

A data delivery vehicle 1440 may receive signals from a plurality of satellites 1460 and determine a position of the data delivery vehicle 1440, wherein the position comprises GNSS coordinates. The data delivery vehicle 1440 may use a sensor to determine a position vector of a physical asset 1450 from the data delivery vehicle 1440. The data delivery vehicle 1440 may determine a position of the physical asset 1450, using GNSS coordinates, using the position of the data delivery vehicle 1440 and the position vector. The data delivery vehicle 1440 may transmit the determined position of the physical asset 1450 to the physical asset 1450.

Figure 15:
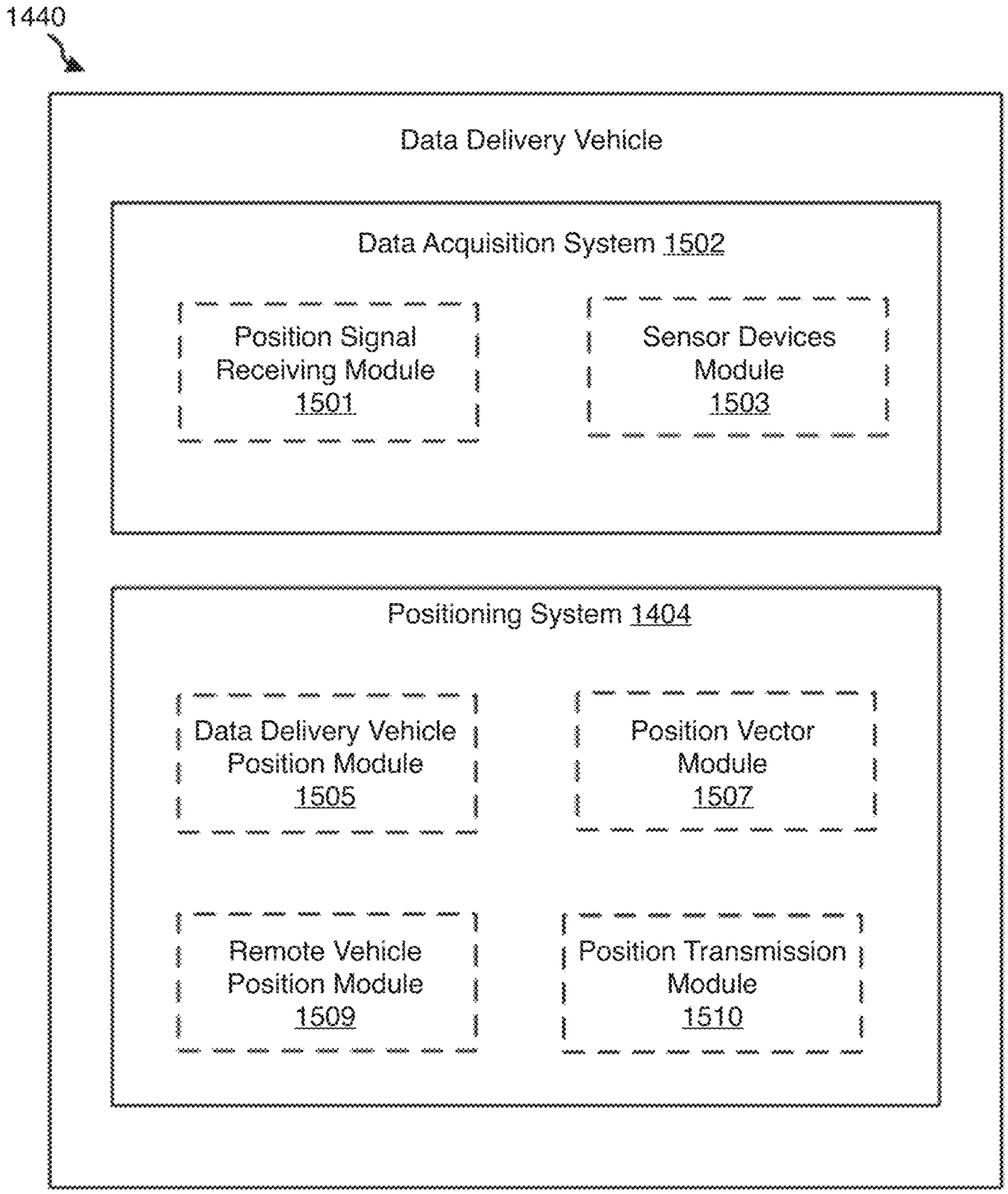
FIG. 15 illustrates, in an example embodiment, a system architecture operative to calculate and communicate location data.

FIG. 15 illustrates an example data delivery vehicle 1440 in greater detail in accordance with an embodiment of the disclosure herein. The data delivery vehicle 1440 may include a data acquisition system 1502, and a positioning system 1404.

The data acquisition system 1502 of the data delivery vehicle 1440 may further comprise a position signal receiving module 1501 and a sensor devices module 1503. The position signal receiving module 1501 may obtain location information associated with the data delivery vehicle 1440. The position signal receiving module 1501 may communicate with global navigation satellite systems (GNSS) such as, but not limited to, GPS, GLONASS, BDS, GALILEO, QZSS, IRNSS, etc. In this manner, the position signal receiving module 1501 may obtain absolute location data based on techniques known in the art.

The sensor devices module 1503 may comprise one or more sensors, including, but not limited to, light detection and ranging (LIDAR) sensor devices, radio detection and ranging (RADAR) sensor devices, infrared optical sensor devices, and/or one or more camera devices. The sensor devices module 1503 may be the same or similar to the sensor suite 223 in in FIG. 11. The sensor devices module 1503 may measure a distance between the data delivery vehicle 1440 and a physical asset 1450. The sensor devices module 1503 may obtain relative location data between the data delivery vehicle 1440 and a physical asset 1450.

The positioning system 1404 may comprise a data delivery vehicle position module 1505, a position vector module 1507, a remote vehicle position module 1509, a position transmission module 1510. The data delivery vehicle position module 1505 may determine GNSS coordinates associated with the data delivery vehicle 1440 from data received from the position signal receiving module 1501. The position vector module 1507 may determine a position vector between the data delivery vehicle 1440 and a physical asset 1450. The remote vehicle position module 1509 may use the GNSS coordinates associated with the data delivery vehicle 1440 and the position vector to determine GNSS coordinates associated with the physical asset 1450. The position transmission module 1510 may transmit the determined GNSS coordinates associated with the physical asset 1450 to the physical asset 1450. The position transmission module 1510 may prepare the determined GNSS coordinates associated with the physical asset 1450 for transmission in a signal interpretable by the physical asset 1450. The signal interpretable by the physical asset 1450 may comprise any communication standard, such as, Internet Protocol (IP), Wi-Fi, Bluetooth, etc.

Figure 16:
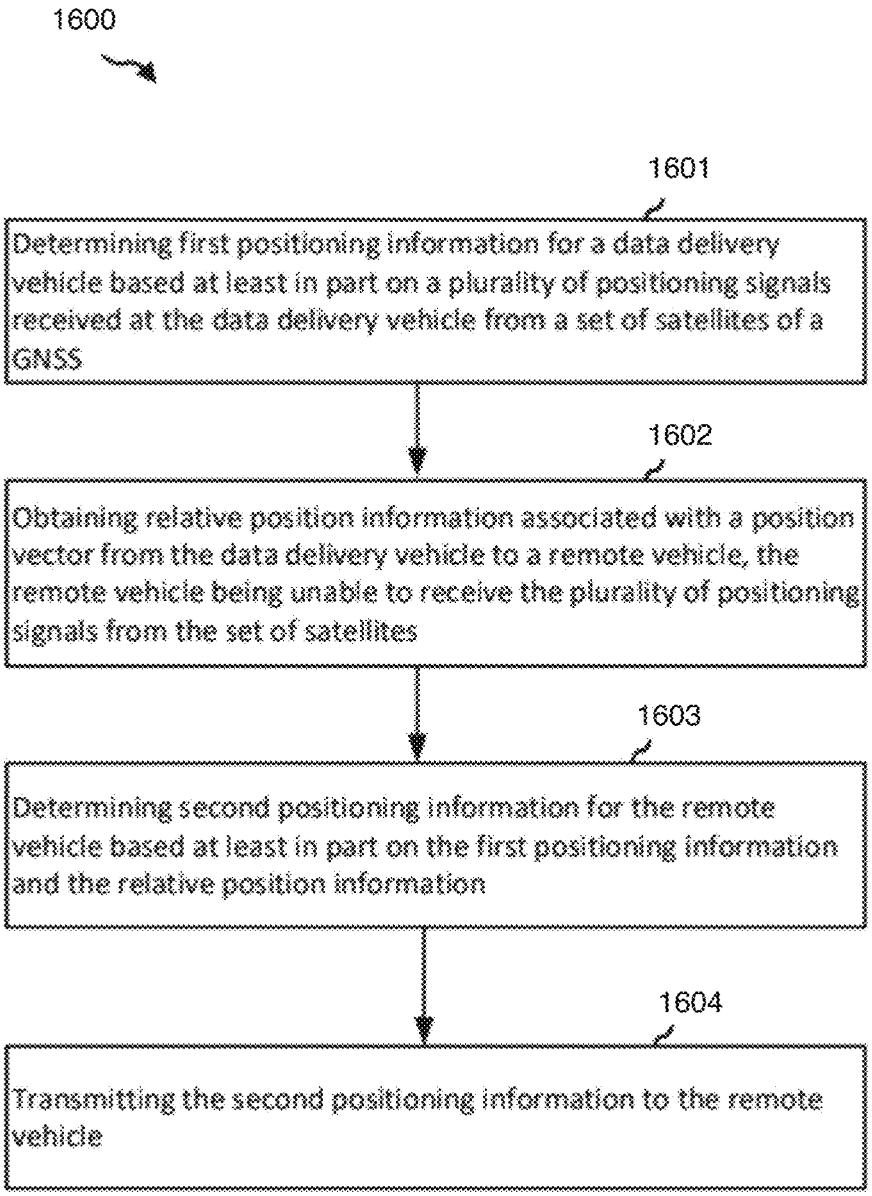
FIG. 16 illustrates, in an example embodiment, a method of obtaining location data.

FIG. 16 illustrates, in an example embodiment, method 1600 of obtaining location data. In embodiments, the method steps or techniques depicted and described herein can be performed in a processor of the data delivery vehicle 1440, the method steps being encoded as processor-executable instructions in a non-transitory memory of the data delivery vehicle 1440. In some embodiments, the techniques disclosed in reference to FIG. 16 can be implemented at least partially in hardware or any combination of software and hardware to manifest functionalities described. The techniques of FIG. 16 may be implemented in an operating system kernel, in a separate user process, in a library package bound into network applications, on a specially constructed machine, on an application-specific integrated circuit (ASIC), or a field programmable gate array (FPGA).

At step 1601, first positioning information for a data delivery vehicle may be determined based at least in part on a plurality of positioning signals received at the data delivery vehicle from a set of satellites of a global navigation satellite system (GNSS). The data delivery vehicle may comprise an autonomous aerial drone.

At step 1602, relative position information associated with a position vector from the data delivery vehicle to a remote vehicle may be obtained. The remote vehicle may be unable to receive the plurality of positioning signals from the set of satellites. The position vector from the data delivery vehicle to the remote vehicle may be defined in accordance with one of a global and a local coordinate system. The position vector may be established based at least in part on a distance and a directional measurement in accordance with a sensor device housed in the data delivery vehicle. The sensor device may comprise at least one of a light detection and ranging (LIDAR) sensor device, a radio detection and ranging (RADAR) sensor device, an infrared optical sensor device, and a camera. At least one of a loss of reception and a degradation in quality of reception of the plurality of positioning signals from the set of satellites may be detected. The data delivery vehicle may be disposed in a docked configuration with the remote vehicle. Responsive to the at least one of the loss and the degradation, the data delivery vehicle may be launched in termination of the docked configuration with the remote vehicle. The at least one of the loss and the degradation may be precipitated by at least one of occlusion, a gradual loss of power, a catastrophic loss of power, ionospheric scintillation, Doppler shift, multipath, jamming, spurious satellite transmission and antenna effects. The data delivery vehicle may navigate to a location that re-establishes reception of the plurality of positioning signals in accordance with a minimum threshold quality of reception thereof. Communication may be established, in accordance with a wireless communication protocol, with the remote vehicle.

At step 1603, second positioning information for the remote vehicle may be determined based at least in part on the first positioning information and the relative position information. The second positioning information for the remote vehicle may be determined in accordance with a global coordinate system consistent with the first positioning information as determined from the plurality of positioning signals received from the set of satellites.

At step 1604, the second positioning information may be transmitted to the remote vehicle. The second positioning information may be transmitted to the remote vehicle in accordance with the wireless communication protocol, said wireless communication protocol being different from a GNSS communication protocol that establishes the first positioning information.

Figure 17:
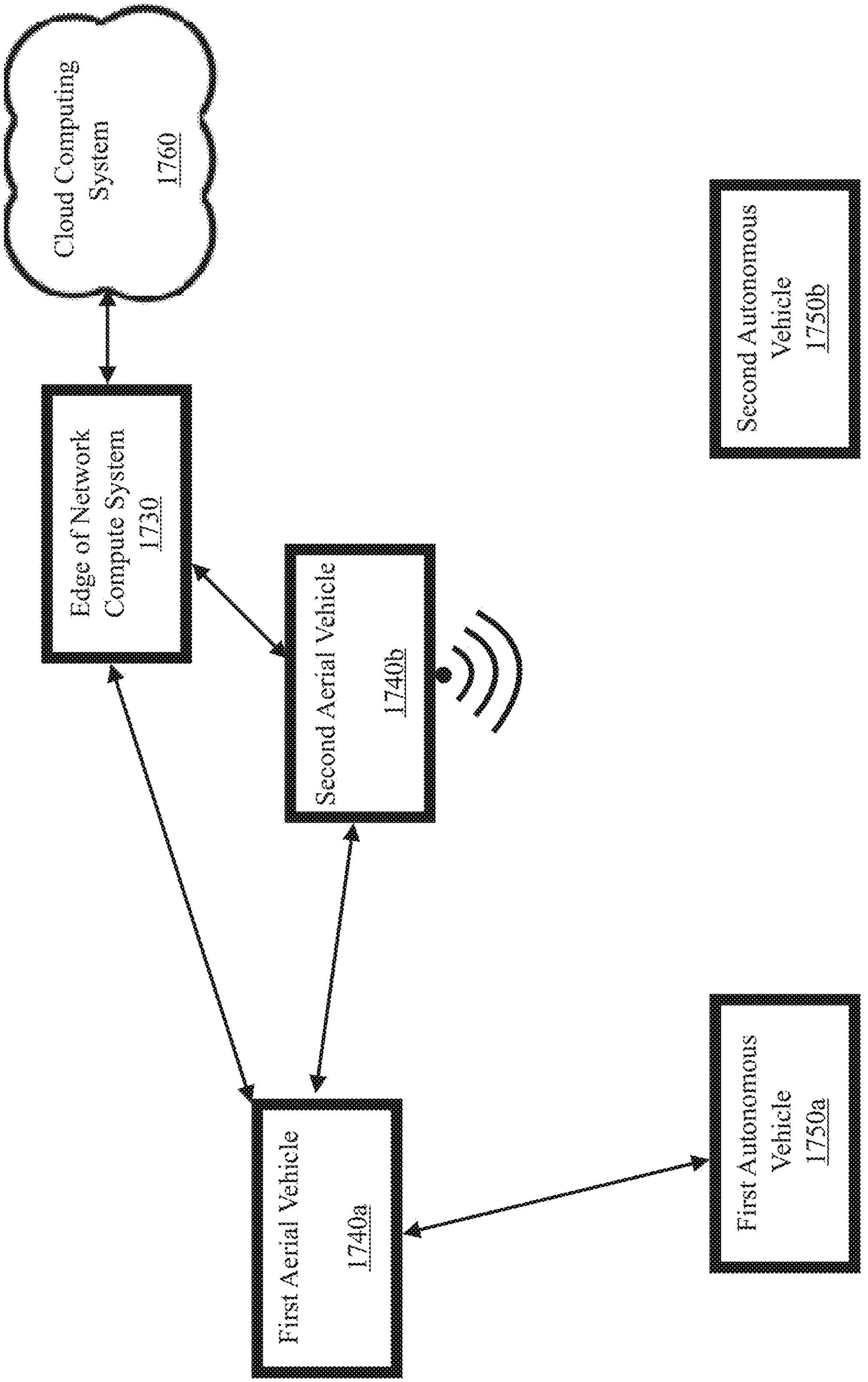
FIG. 17 illustrates an exemplary embodiment of the inventive system described herein.

FIG. 17 illustrates, in an example embodiment, an operational environment. The operational environment may comprise one or more aerial vehicles 1740*a-b*, one or more autonomous vehicles 1750*a-b*, an edge of node compute system 1730, and a cloud computing system 1760. The one or more aerial vehicles 1740*a-b* may be or comprise any aerial vehicle previously mentioned, such as the data delivery vehicles 140 or the data delivery vehicles 1440. The one or more autonomous vehicles 1750*a-b* may be or comprise any autonomous vehicle previously mentioned, such as the combine harvester 1, the grain cart 2, the tractor trailer 3, physical assets 110, or the physical assets 1450. The edge of node compute system 1730 may be or comprise any previously mentioned computing system, such as the local area compute node 130. The cloud computing system 1760 may be or comprise any cloud computing system previously mentioned, such as the cloud compute node 160. One or more of the one or more aerial vehicles 1740*a-b*, one or more autonomous vehicles 1750*a-b*, edge of node compute system 1730, and cloud computing system 1760 may comprise a path planning unit 1800, as described in reference to FIG. 18. The one or more aerial vehicles 1740*a-b*, one or more autonomous vehicles 1750*a-b*, edge of node compute system 1730, and/or cloud computing system 1760 may be or comprise any computing device mentioned below, such as the computing device 10 in FIG. 6, the system 20 in FIG. 7, the architecture 30 in FIG. 8, and/or the computer system 40 in FIG. 9.

The first autonomous vehicle 1750*a* and the second autonomous vehicle 1750*b* may each comprise a planned path. The planned path may comprise, for example, a path along a mine, such as a coal mine, a path along a field, such as grain field, etc. Each of the autonomous vehicles 1750*a-b* may comprise a suite of sensors for determining surroundings. The suite of sensors may comprise at least one of a light detection and ranging (LIDAR) sensor device, a radio detection and ranging (RADAR) sensor device, an infrared optical sensor device, and a camera. Each of the autonomous vehicles 1750*a-b* may comprise positioning units, such as Global Positioning System (GPS) units. Each of the autonomous vehicles 1750*a-b* may determine or receive information indicating a position of the autonomous vehicle 1750*a-b* within an associated planned path. Each of the autonomous vehicles 1750*a-b* may alter the planned path based on information received from its associated suite of sensors. Each of the autonomous vehicles 1750*a-b* may communicate its planned path information with other autonomous vehicles to coordinate movement. Each of the autonomous vehicles 1750*a-b* may communicate information from its suite of sensors with other autonomous vehicles.

The first aerial vehicle 1740*a* and the second aerial vehicle 1740*b* may travel along or around a planned path. For example, the first aerial vehicle 1740*a* may travel a planned path associated with the first autonomous vehicle 1750*a*. The first aerial vehicle 1740*a* may travel a predetermined distance ahead of the first autonomous vehicle 1750*a* on the planned path. The first aerial vehicle 1740*a* may orbit the first autonomous vehicle 1750*a*. Each of the aerial vehicles 1740*a-b* may create a constellation to monitor (e.g., scout, canvass, etc.) an area, such as a mine or a field. Each of the aerial vehicles 1740*a-b* may comprise a suite of sensors for determining surroundings. The suite of sensors may comprise at least one of a light detection and ranging (LIDAR) sensor device, a radio detection and ranging (RADAR) sensor device, an infrared optical sensor device, and a camera. Each of the aerial vehicles 1740*a-b* may comprise positioning units, such as Global Positioning System (GPS) units. Each of the aerial vehicles 1740*a-b* may determine or receive information indicating a position of the aerial vehicle 1740*a-b* within an associated planned path. An aerial vehicle 1740*a-b* may transmit location information and/or sensed data to an autonomous vehicle 1750*a-b*. For example, the first aerial vehicle 1740*a* may transmit its location information and/or sensed data to the first autonomous vehicle 1750*a*. Each of the aerial vehicles 1740*a-b* may broadcast location information and/or sensed data, which may be received and interpreted by the autonomous vehicles 1750*a-b*. An aerial vehicle 1740*a-b* may cause the planned path of an autonomous vehicle 1750*a-b* to be altered based on information received from its associated suite of sensors. For example, the first aerial vehicle 1740*a* may cause the planned path of the first autonomous vehicle 1750*a* to be altered based on information received from its associated suite of sensors. Each of the aerial vehicles 1740*a-b* may communicate its planned path information and/or location with other aerial vehicles to coordinate movement. Each of the aerial vehicles 1740*a-b* may communicate information from its suite of sensors with other aerial vehicles. Each of the aerial vehicles 1740*a-b* may communicate its location information and/or sensed data and/or associated planned path to the edge of network compute system 1730.

The edge of network compute system 1730 may communicate with the aerial vehicles 1740*a-b*. The edge of network compute system 1730 may receive location information, planned paths, and/or sensed data from the aerial vehicles 1740*a-b*. The edge of network compute system 1730 may determine (e.g., compute, create, etc.) a planned path for a particular autonomous vehicle, such as the first autonomous vehicle 1750*a*. The edge of network compute system 1730 may transmit a determined planned path for a particular autonomous vehicle to an associated aerial vehicle, such as the first aerial vehicle 1740*a*.

The cloud computing system 1760 may communicate with the edge of network compute system 1730. The cloud computing system 1760 may comprise access to a network, such as the Internet. The cloud computing system 1760 may receive location information, planned paths, and/or sensed data from the edge of network compute system 1730. The cloud computing system 1760 may receive data, such as weather forecast data, traffic data, pricing data, etc. from a remote server. The cloud computing system 1760 may determine a planned path and/or an operation mode for a particular autonomous vehicle, such as the first autonomous vehicle 1750*a*. For example, if weather forecast data indicates that the planned path will be impassable for the day, a determined operation mode may comprise stopping the vehicle. As another example, if pricing data indicates that the mined metal is no longer profitable, a determined operation mode may comprise stopping the vehicle. The cloud computing system 1760 may transmit the determined planned path and/or operation mode to the edge of network compute system 1730. The cloud computing system 1760 may transmit the data received from the remote server to the edge of network compute system 1730. The edge of network compute system 1730 may use the data received from the remote server in determinations (e.g., computations, creations, etc.), such as determined planned paths and/or may transmit the data received from the remote server to the aerial vehicles 1740*a-b*. The aerial vehicles 1740*a-b* may use the data received from the remote server in determinations and/or may transmit the data received from the remote server to the autonomous vehicles 1740*a-b* for use in determinations.

The first autonomous vehicle 1750*a* may travel along a planned path in a field to harvest wheat. The first aerial vehicle 1740*a* may travel 200 feet in front of the planned path. Sensors associated with the first aerial vehicle 1740*a* may detect an object in the planned path. The first aerial vehicle 1740*a* may request information about a location associated with the object from the second aerial vehicle 1740*b*. The first aerial vehicle 1740*a* may use data from its sensors and sensors associated with the second aerial vehicle 1740*b* to determine that the detected object in the planned path is big enough to possibly be a problem for the first autonomous vehicle 1750*a*. The first aerial vehicle 1740*a* may update the planned path for the first autonomous vehicle 1750*a* to avoid the object. The first aerial vehicle 1740*a* may transmit the updated planned path to the first autonomous vehicle 1750*a*, the second aerial vehicle 1740*b*, and the edge of network compute system 1730. The edge of network compute system 1730 may transmit the updated planned path to the cloud computing system 1760, which may transmit the updated planned path to a remote server, such as a central operations computer. The first autonomous vehicle 1750*a* may alter its navigation based on the updated planned path. The second aerial vehicle 1740*b* may broadcast the object and the updated planned path. The second autonomous vehicle 1750*b* may receive the broadcast from the second aerial vehicle 1740*b*. The second autonomous vehicle 1750*b* may determine that it will encounter the object on its planned path and that the updated planned path will get the second autonomous vehicle 1750*b* to its destination. The second autonomous vehicle 1750*b* may adopt the updated planned path as its updated planned path as well.

Figure 18:
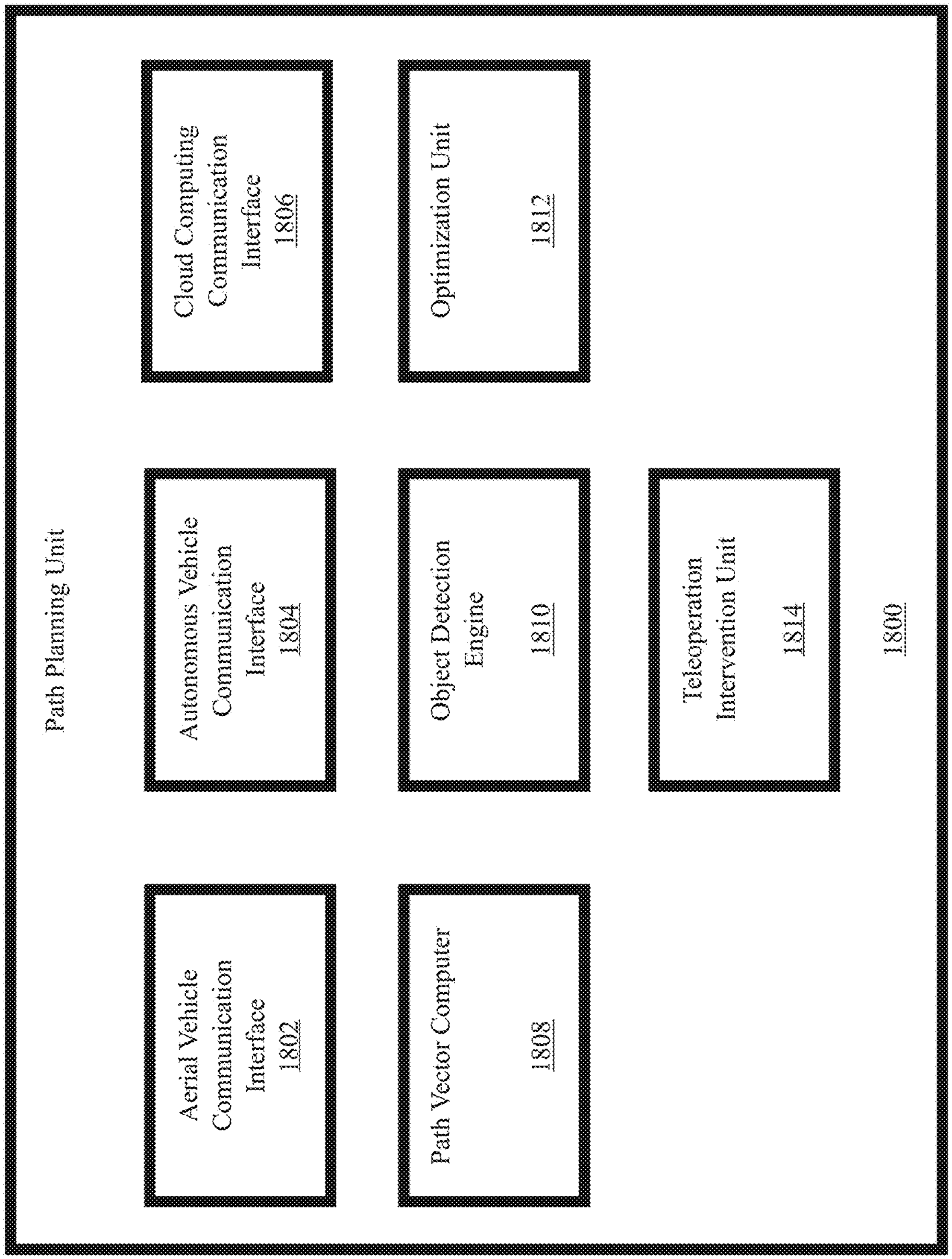
FIG. 18 illustrates an exemplary path planning unit in accordance with an embodiment of the invention.

FIG. 18 illustrates an exemplary path planning unit 1800. The one or more aerial vehicles 1740*a-b*, may comprise the exemplary path planning unit 1800. The one or more autonomous vehicles 1750*a-b* may comprise the exemplary path planning unit 1800. The edge of node compute system 1730 may comprise the exemplary path planning unit 1800. The exemplary path planning unit 1800 may comprise an aerial vehicle communication interface 1802, an autonomous vehicle communication interface 1804, a cloud computing communication interface 1806, a path vector computer 1808, an object detection engine 1810, an optimization unit 1812, and a teleoperation intervention unit 1814.

The aerial vehicle communication interface 1802 may facilitate the transfer of information between an aerial vehicle 1740*a-b* and the path planning unit 1800. The aerial vehicle communication interface 1802 may convert outgoing messages from a format accessible by the path planning unit 1800 into a format accessible by an aerial vehicle 1740*a-b*. The aerial vehicle communication interface 1802 may convert incoming messages from a format accessible by an aerial vehicle 1740*a-b* into a format accessible by the path planning unit 1800. The aerial vehicle communication interface 1802 may send and/or receive messages arranged according to any standard, such as, Internet Protocol (IP), Wi-Fi, Bluetooth, etc.

The autonomous vehicle communication interface 1804 may facilitate the transfer of information between an autonomous vehicle 1750*a-b* and the path planning unit 1800. The autonomous vehicle communication interface 1804 may convert outgoing messages from a format accessible by the path planning unit 1800 into a format accessible by an autonomous vehicle 1750*a-b*. The autonomous vehicle communication interface 1804 may convert incoming messages from a format accessible by an autonomous vehicle 1750*a-b* into a format accessible by the path planning unit 1800. The autonomous vehicle communication interface 1804 may send and/or receive messages arranged according to any standard, such as, Internet Protocol (IP), Wi-Fi, Bluetooth, etc.

The cloud computing communication interface 1806 may facilitate the transfer of information between the path planning unit 1800 and/or the edge of node compute system 1730 and/or the cloud computing system 1760. The cloud computing communication interface 1806 may convert outgoing messages from a format accessible by the path planning unit 1800 into a format accessible by the edge of node compute system 1730 and/or the cloud computing system 1760. The cloud computing communication interface 1806 may convert incoming messages from a format accessible by the edge of node compute system 1730 and/or the cloud computing system 1760 into a format accessible by the path planning unit 1800. The cloud computing communication interface 1806 may send and/or receive messages arranged according to any standard, such as, Internet Protocol (IP), Wi-Fi, Bluetooth, etc.

The path vector computer 1808 may compute a planned path vector or a series of planned path vectors based on a starting point, an ending point, and available routes. The starting point may be a current location for the one or more autonomous vehicles 1750*a-b* and/or the one or more aerial vehicles 1740*a-b*. The ending point may comprise a starting point for another path vector. The ending point may comprise a final destination. The path vector computer 1808 may interpret sensor and location data. The path vector computer 1808 may determine a position within a planned path of an object, such as the one or more autonomous vehicles 1750*a-b* and/or the one or more aerial vehicles 1740*a-b*. The path vector computer 1808 may determine a direction within the planned path for the object. The path vector computer 1808 may determine a traverse speed through the planned path for the object. The path vector computer 1808 may continuously update the planned path vector or the series of planned path vectors based on sensor information and/or information received from one or more of the object detection engine 1810, the optimization unit 1812, and the teleoperation intervention unit 1814.

The object detection engine 1810 may detect an object, such as a foreign impassable object, with a planned path. The object detection engine 1810 may interpret sensor, location, and planned path data. In an aspect, if the object detection engine 1810 detects an object at a particular spot, sections of routes intersecting the particular spot may be considered invalid for other modules, such as the path vector computer 1808, the optimization unit 1812, the teleoperation intervention unit 1814, etc.

The optimization unit 1812 may cause data from sensors to be properly prioritized. The optimization unit 1812 may apply weighting factors to data received from sensors. The optimization unit 1812 may select priority instructions from data received from sensors. For example, a weighting factor may relate to a height of an object. If the size of the object appears to have little or no height, such as a sticker or a piece of paper, then the priority instructions may indicate that the object should be ignored.

The teleoperation intervention unit 1814 may allow a user to end autonomous control of the one or more autonomous vehicles 1750*a-b* and/or the one or more aerial vehicles 1740*a-b*. The teleoperation intervention unit 1814 may allow a user to remotely control the one or more autonomous vehicles 1750*a-b* and/or the one or more aerial vehicles 1740*a-b*. For example, if an autonomous vehicle gets stuck, a user may remotely navigate the autonomous vehicle to a clear spot and resume autonomous control of the autonomous vehicle. The teleoperation intervention unit 1814 may receive data from sensors. Machine learning and/or artificial intelligence may be used to take information received from the teleoperation intervention unit 1814 to improve performance of the path vector computer 1808, the object detection engine 1810, and/or the optimization unit 1812.

Figure 19:
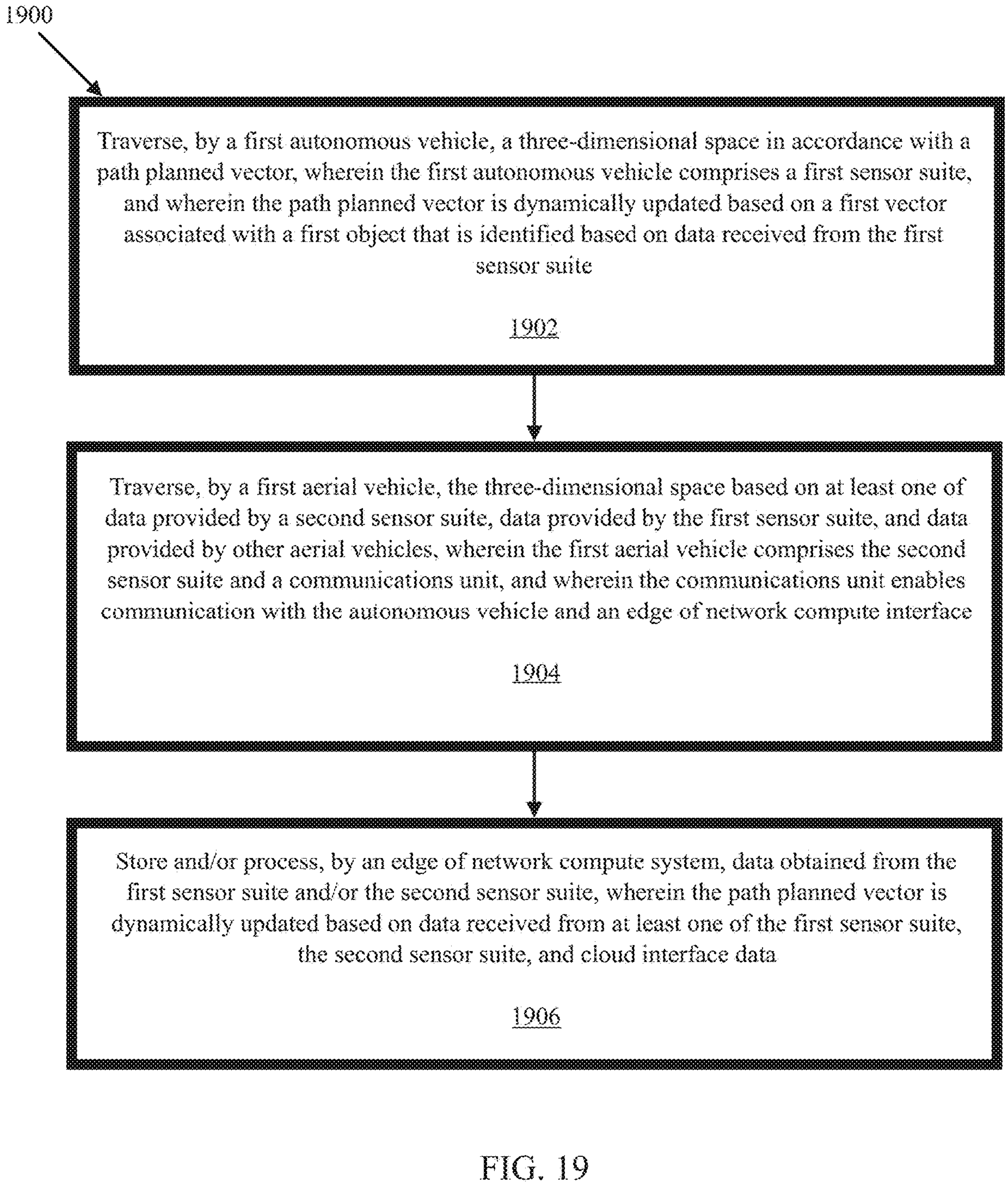
FIG. 19 illustrates, in an example embodiment, a method of dynamically updating a planned path.

FIG. 19 illustrates, in an example embodiment, method 1900 of an aerial vehicle-in-loop compute and communications system for enabling at least one autonomous device to traverse a three-dimensional space. In embodiments, the method steps or techniques depicted and described herein can be performed in a processor of an aerial vehicle, such as the aerial vehicles 1740*a-b* in FIG. 17, the method steps being encoded as processor-executable instructions in a non-transitory memory of an aerial vehicle. In embodiments, the method steps or techniques depicted and described herein can be performed in a processor of an autonomous vehicle, such as the autonomous vehicles 1750*a-b* in FIG. 17, the method steps being encoded as processor-executable instructions in a non-transitory memory of an autonomous vehicle. In embodiments, the method steps or techniques depicted and described herein can be performed in a processor of an edge of network compute system, such as the edge network compute system 1730 in FIG. 17, the method steps being encoded as processor-executable instructions in a non-transitory memory of an edge of network compute system. In some embodiments, the techniques disclosed in reference to FIG. 19 can be implemented at least partially in hardware or any combination of software and hardware to manifest functionalities described. The techniques of FIG. 19 may be implemented in an operating system kernel, in a separate user process, in a library package bound into network applications, on a specially constructed machine, on an application-specific integrated circuit (ASIC), or a field programmable gate array (FPGA).

At step 1902, a three-dimensional space may be traversed by a first autonomous vehicle in accordance with a path planned vector. The first autonomous vehicle may comprise a first sensor suite. The path planned vector may be dynamically updated based on a first vector associated with a first object that is identified based on data received from the first sensor suite. The path planned vector may be computed by a path planning unit on the first autonomous vehicle. The first autonomous vehicle may be operating in coordination with other autonomous vehicles. The first sensor suite may comprise at least one of a light detection and ranging (LIDAR) sensor device, a radio detection and ranging (RADAR) sensor device, an infrared optical sensor device, and a camera. The first autonomous vehicle may be used to mine for earth metals. The first autonomous vehicle may be used in a farming and/or harvesting application.

At step 1904, the three-dimensional space may be traversed by a first aerial vehicle based on at least one of data provided by a second sensor suite, data provided by a first sensor suite, and data provided by other aerial vehicles. The first aerial vehicle may comprise the second sensor suite and a communications unit. The communications unit enables communication with the autonomous vehicle and an edge of network compute interface. The path planned vector may be computed by a path planning unit on the first aerial vehicle. The first aerial vehicle may traverse the three-dimensional space in association with the first autonomous vehicle. The first aerial vehicle may traverse a first distance relative to the first autonomous vehicle based on at least one of: the first vector associated with the first object that is identified based on data received from the first first sensor suite, a second vector associated with the first object and/or a second object identified by the second sensor suite, the path planned vector of the first autonomous vehicle, and a traverse vector associated with other aerial vehicles in an area of interest. The first object and/or the second object may be dynamic and also may traverse the three-dimensional space. The first aerial vehicle may operate as a device within a constellation of aerial vehicles. The first aerial vehicle may provide at least one of the following data to the first autonomous vehicle: raw data obtained from the second sensor suite, path planning data, and executive control data. The second sensor suite may comprise at least one of a light detection and ranging (LIDAR) sensor device, a radio detection and ranging (RADAR) sensor device, an infrared optical sensor device, and a camera. The first aerial vehicle may comprise a default setting. The default setting may comprise the first aerial vehicle travelling in an orbit around the first autonomous vehicle. The default setting may comprise the first aerial vehicle docking to the first autonomous vehicle At step 1906, data obtained from the first sensor suite and/or the second sensor suite may be stored and/or processed by an edge of network compute system. The path planned vector may be dynamically updated based on data received from at least one of the first sensor suite, the second sensor suite, and cloud interface data. The path planned vector may be computed by a path planning unit on the the edge of network compute system or a cloud computing system in communication with the edge of network compute system. Optionally, one or more of the first autonomous vehicle, the first aerial vehicle, and the edge of network compute system may comprise an optimization unit for applying weighting factors to data received from the first sensor suite and the second sensor suite. The optimization unit may select priority instructions from at least one of and/or a combination of data from the first sensor suite and the second sensor suite. Optionally, one or more of the first autonomous vehicle, the first aerial vehicle, and the edge of network compute system may comprise a teleoperation intervention unit. The first sensor data and second sensor data may be provided to the teleoperation intervention unit. The first aerial vehicle may traverse to a location within the three-dimensional space based on instructions received from the teleoperation intervention unit.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card, FPGA or GPU.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 6:
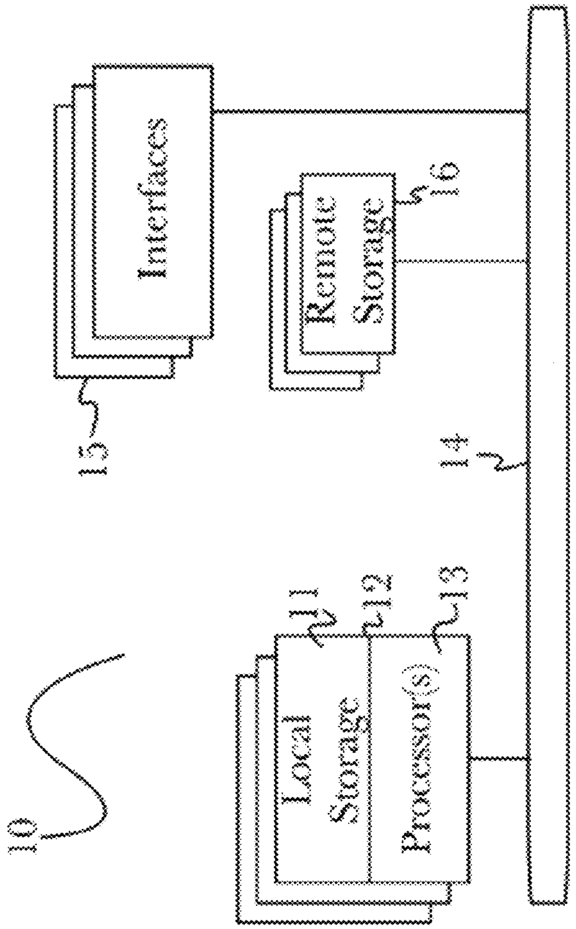
FIG. 6 is an exemplary block diagram of a computing device.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, PCI Express, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
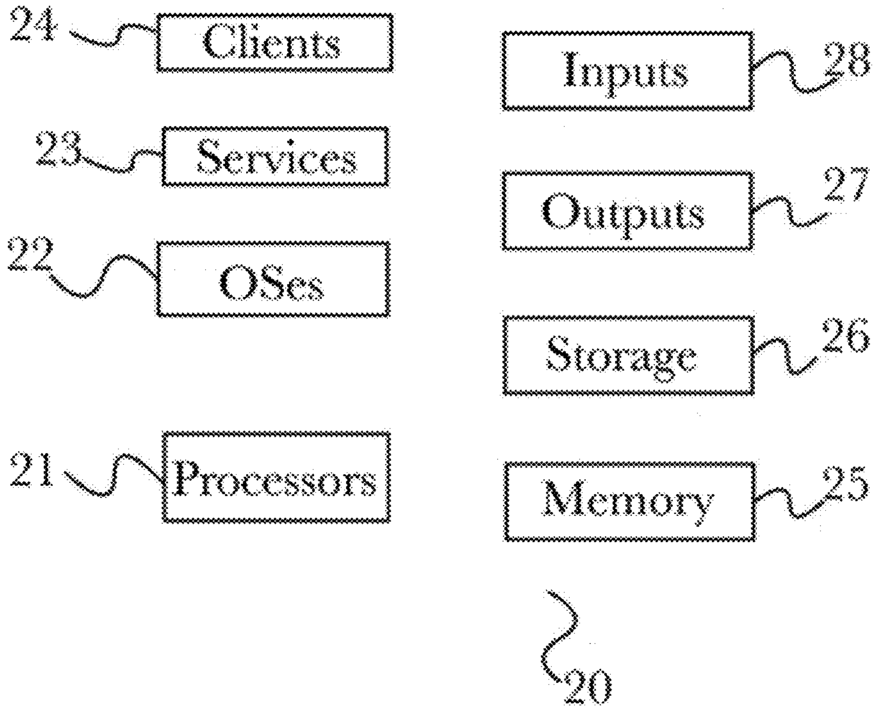
FIG. 7 is a block diagram depicting a typical exemplary architecture of one or more embodiments or components thereof on a standalone computing system.

In some embodiments, systems may be implemented on a standalone computing system. Referring now to FIG. 7, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 8:
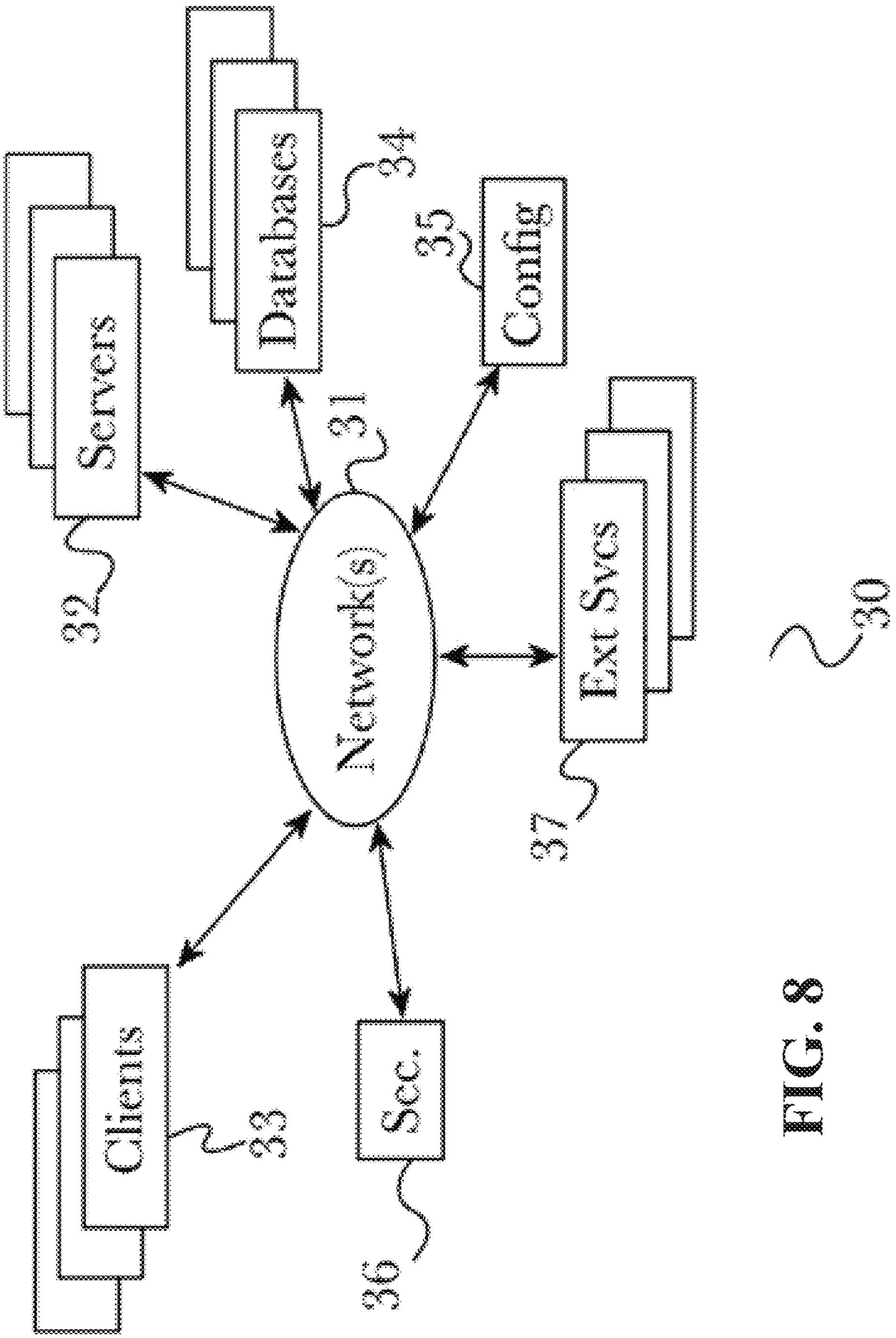
FIG. 8 is a block diagram depicting an exemplary architecture for implementing at least a portion of a system according to one aspect on a distributed computing network.

In some embodiments, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 9:
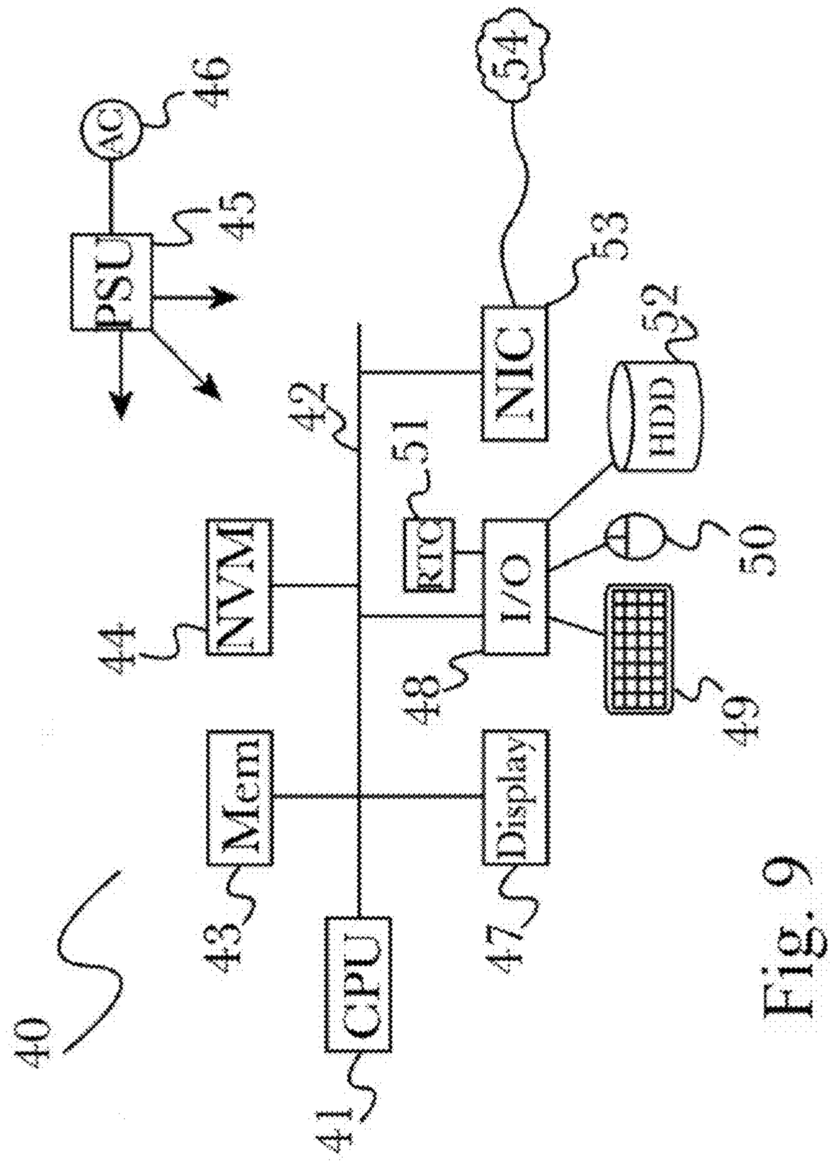
FIG. 9 is an exemplary overview of a computer system.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A method comprising:

detecting at least one of a loss of reception and a degradation in quality of reception of at least one positioning signal received at a data delivery vehicle, the at least one positioning signal received from at least one satellite of a global navigation satellite system (GNSS), wherein the data delivery vehicle is disposed in a docked configuration with a remote vehicle, the remote vehicle being unable to receive positioning signals from the at least one satellite;

launching, responsive to the at least one of the loss and the degradation, the data delivery vehicle in termination of the docked configuration with the remote vehicle;

obtaining relative position information associated with a position vector from the data delivery vehicle to the remote vehicle;

determining positioning information for the remote vehicle based at least in part on the relative position information; and transmitting the positioning information to the remote vehicle.

2. The method of claim 1 wherein the position vector from the data delivery vehicle to the remote vehicle is defined in accordance with one of a global and a local coordinate system.

3. The method of claim 1 wherein the position vector is established based at least in part on a distance and a directional measurement in accordance with a sensor device housed in the data delivery vehicle.

4. The method of claim 3 wherein the sensor device comprises at least one of a light detection and ranging (LIDAR) sensor device, a radio detection and ranging (RADAR) sensor device, an infrared optical sensor device, and a camera.

5. The method of claim 1 further comprising determining the positioning information for the remote vehicle in accordance with a global coordinate system consistent with the at least one positioning signal received from the at least one satellite.

6. The method of claim 1 wherein the at least one of the loss and the degradation is precipitated by at least one of occlusion, a gradual loss of power, a catastrophic loss of power, ionospheric scintillation, Doppler shift, multipath, jamming, spurious satellite transmission and antenna effects.

7. The method of claim 1 further comprising:

navigating, by the data delivery vehicle, to a location that re-establishes reception of the at least one positioning signal in accordance with a minimum threshold quality of reception thereof; and establishing communication, in accordance with a wireless communication protocol, with the remote vehicle.

8. The method of claim 7 further comprising transmitting the positioning information to the remote vehicle in accordance with the wireless communication protocol, said wireless communication protocol being different from a GNSS communication protocol that establishes the at least one positioning signal.

9. The method of claim 1 wherein the data delivery vehicle comprises an autonomous aerial drone.

10. An aerial data delivery vehicle comprising:

a processor; and a memory, the memory including instructions executable in the processor, the instructions when executed in the processor causing operations comprising:

detecting at least one of a loss of reception and a degradation in quality of reception of at least one positioning signal received at a data delivery vehicle, the at least one positioning signal received from at least one satellite of a global navigation satellite system (GNSS), wherein the data delivery vehicle is disposed in a docked configuration with a remote vehicle, the remote vehicle being unable to receive positioning signals from the at least one satellite;

launching, responsive to the at least one of the loss and the degradation, the data delivery vehicle in termination of the docked configuration with the remote vehicle;

obtaining relative position information associated with a position vector from the data delivery vehicle to the remote vehicle;

determining positioning information for the remote vehicle based at least in part on the relative position information; and transmitting the positioning information to the remote vehicle.

11. The aerial data delivery vehicle of claim 10 wherein the position vector from the data delivery vehicle to the remote vehicle is defined in accordance with one of a global and a local coordinate system.

12. The aerial data delivery vehicle of claim 10 wherein the position vector is established based at least in part on a distance and a directional measurement in accordance with a sensor device housed in the data delivery vehicle.

13. The aerial data delivery vehicle of claim 12 wherein the sensor device comprises at least one of a light detection and ranging (LIDAR) sensor device, a radio detection and ranging (RADAR) sensor device, an infrared optical sensor device, and a camera.

14. The aerial data delivery vehicle of claim 10 further comprising determining the positioning information for the remote vehicle in accordance with a global coordinate system consistent with the at least one positioning signal received from the at least one satellite.

15. The aerial data delivery vehicle of claim 10 wherein the at least one of the loss and the degradation is precipitated by at least one of occlusion, a gradual loss of power, a catastrophic loss of power, ionospheric scintillation, Doppler shift, multipath, jamming, spurious satellite transmission and antenna effects.

16. The aerial data delivery vehicle of claim 10 further comprising:

navigating, by the data delivery vehicle, to a location that re-establishes reception of the at least one positioning signal in accordance with a minimum threshold quality of reception thereof; and establishing communication, in accordance with a wireless communication protocol, with the remote vehicle.

17. The aerial data delivery vehicle of claim 16 further comprising transmitting the positioning information to the remote vehicle in accordance with the wireless communication protocol, said wireless communication protocol different from a GNSS communication protocol that establishes the at least one positioning signal.

18. A computer readable non-transitory memory including instructions executable in a processor, the instructions when executed in the processor causing operations comprising:

detecting at least one of a loss of reception and a degradation in quality of reception of at least one positioning signal received at a data delivery vehicle, the at least one positioning signal received from at least one satellite of a global navigation satellite system (GNSS), wherein the data delivery vehicle is disposed in a docked configuration with a remote vehicle, the remote vehicle being unable to receive positioning signals from the at least one satellite;

launching, responsive to the at least one of the loss and the degradation, the data delivery vehicle in termination of the docked configuration with the remote vehicle;

obtaining relative position information associated with a position vector from the data delivery vehicle to the remote vehicle;

determining positioning information for the remote vehicle based at least in part on the relative position information; and transmitting the positioning information to the remote vehicle.

* * * * *